United States Patent [19]

Kitaura et al.

[11] Patent Number: 5,144,427
[45] Date of Patent: Sep. 1, 1992

[54] TELEVISION RECEIVER DECODER APPARATUS FOR BANDWIDTH-COMPRESSED HIGH DEFINITION TELEVISION SIGNAL

[75] Inventors: Masahiro Kitaura, Nagareyama; Tomoaki Uchida, Noda, both of Japan

[73] Assignee: Victor Company of Japan, Ltd., Yokohama, Japan

[21] Appl. No.: 540,748

[22] Filed: Jun. 20, 1990

[30] Foreign Application Priority Data

Jun. 20, 1990 [JP] Japan ................. 1-157994

[51] Int. Cl.$^5$ .................. H04N 7/12; H04N 7/13
[52] U.S. Cl. .................. 358/136; 358/133; 358/135; 358/138; 358/105
[58] Field of Search ........... 358/136, 133, 138, 135, 358/105, 140, 141, 142, 11, 12

[56] References Cited

U.S. PATENT DOCUMENTS

| | | | |
|---|---|---|---|
| 4,692,801 | 9/1987 | Ninomiya et al. | 358/136 |
| 4,979,037 | 12/1990 | Mizutani et al. | 358/133 |
| 4,979,040 | 12/1990 | Masumoto | 358/133 |
| 4,984,077 | 1/1991 | Uchida | 358/140 |

OTHER PUBLICATIONS

"HDTV and Today's Broadcasting World" by Yozo Ono; SMPTE Journal, Jan. 1990.
"Muse Transmission System for High-Vision Broadcasting Using Earth Satellite" by Y. Ninomiya; Nikkei Electronics (Japan), Nov. 2, 1987; pp. 189-212.

Primary Examiner—James J. Groody
Assistant Examiner—Michael L. Lee
Attorney, Agent, or Firm—Lowe, Price, LeBlanc & Becker

[57] ABSTRACT

An decoder apparatus for use in a TV receiver, for processing a MUSE bandwidth-compressed television signal, in which a field of that signal which occurs one frame interval prior to the currently received field is used as a reference field for motion vector compensation operation in which images in static regions of every four successive frames are combined, to obtain high display definition for such regions during overall motion of the television picture. As a result, the apparent central position of a moving region in the displayed picture (when that region is incorrectly processed as a static region) and the central position of that moving region (when it is correctly processed) are made closely adjacent, thereby substantially eliminating adverse effects in a display picture which can occur due to such erroneous processing.

3 Claims, 14 Drawing Sheets

(STATIC IMAGE COMPONENTS)

(MOVING IMAGE COMPONENTS)

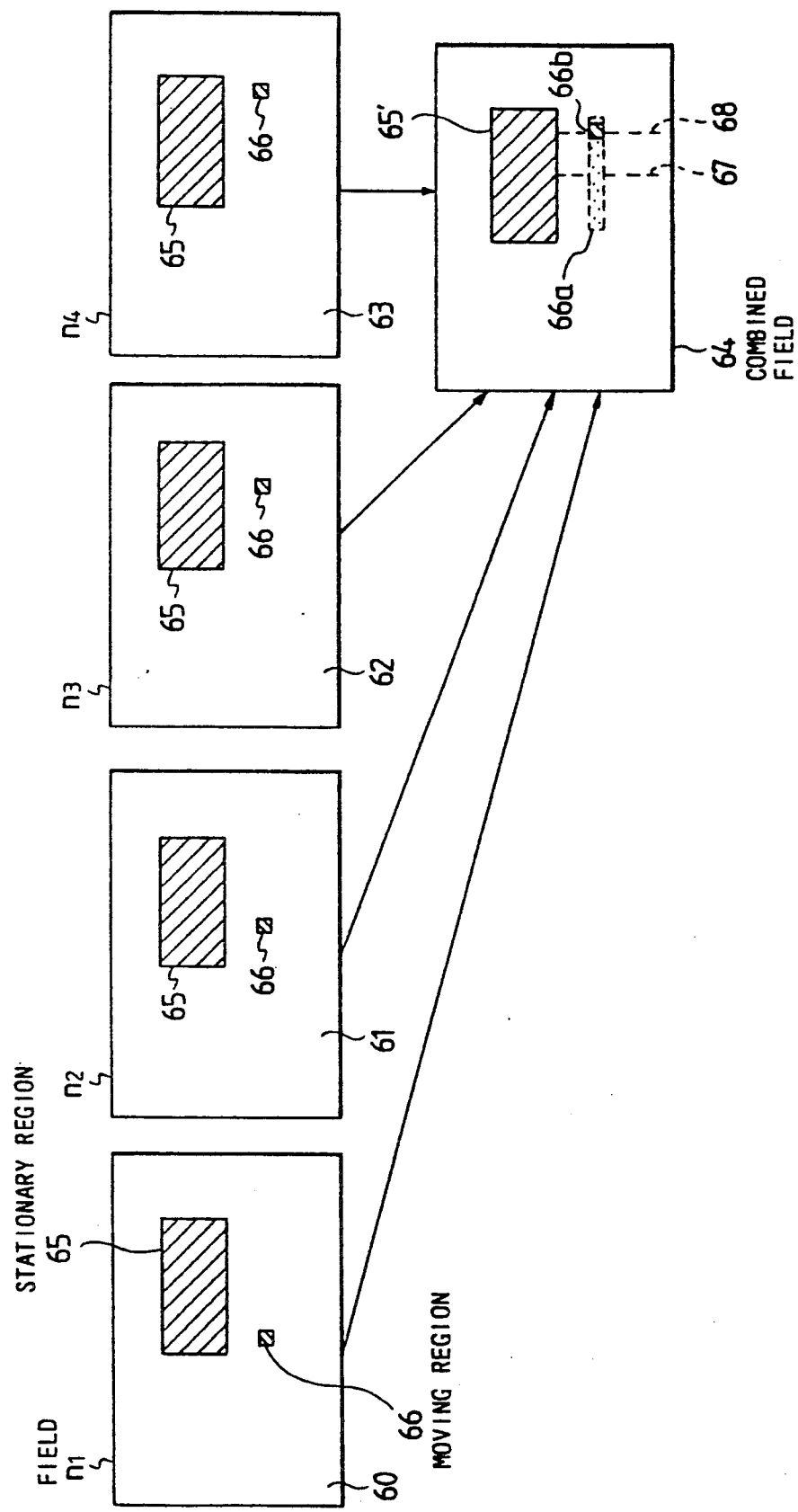

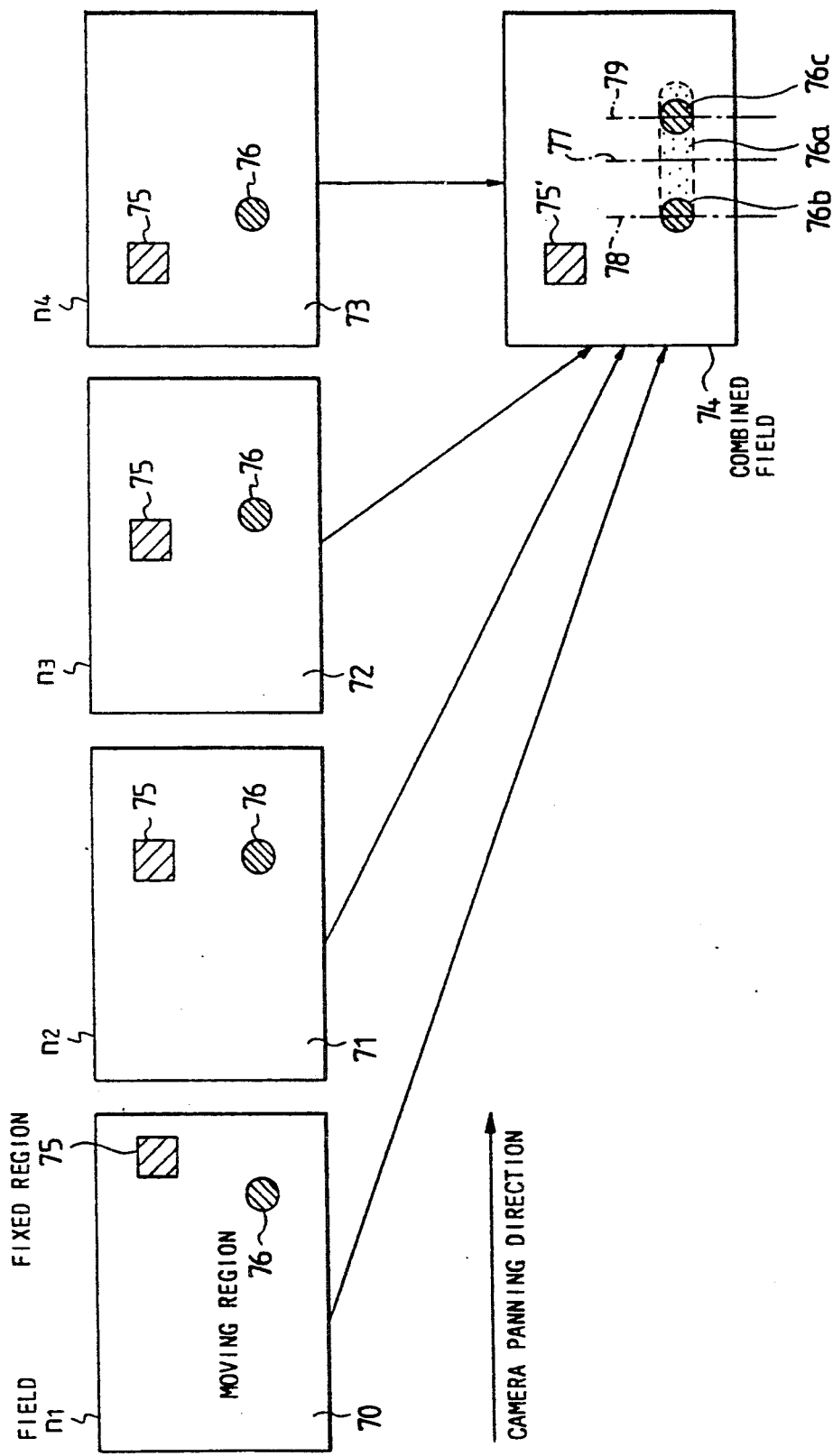

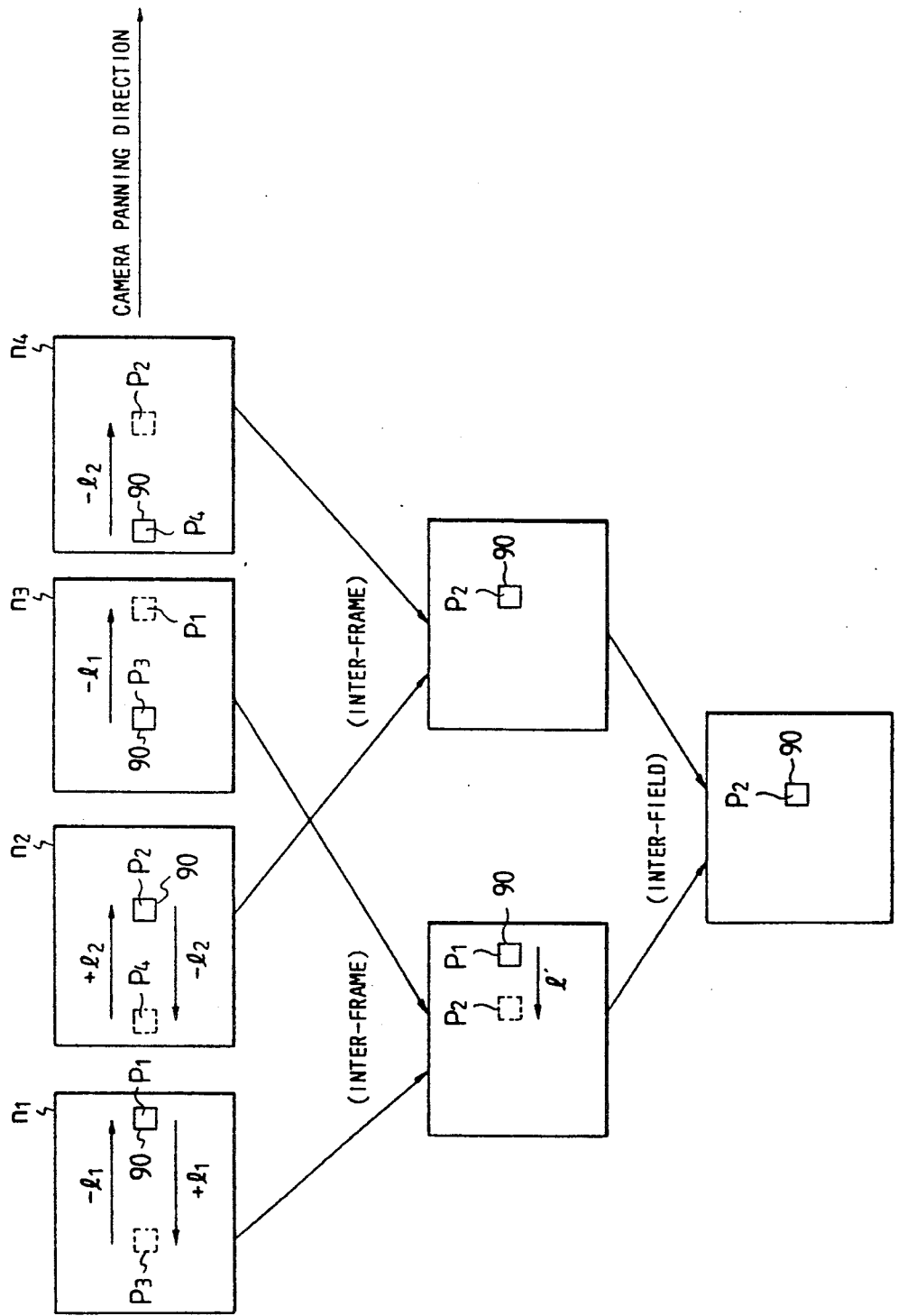

TELEVISION RECEIVER DECODER APPARATUS FOR BANDWIDTH-COMPRESSED HIGH DEFINITION TELEVISION SIGNAL

BACKGROUND OF THE INVENTION

Field of Application

The present invention relates to a decoder apparatus for use in a television receiver, for processing a bandwidth-compressed high-definition television signal, and in particular to a decoder apparatus for processing a MUSE (multiple sub-Nyquist sampling encoding) system television signal.

The MUSE system has been developed by NHK (Japan Broadcasting Corporation) in order to enable a high definition television signal (abbreviated in the following to HDTV signal) to be bandwidth-compressed to a MUSE signal, which can be transmitted via a channel of approximately 8 MHz bandwidth of a broadcast satellite. Pixels which are within static regions of the picture and pixels which are within moving regions of the picture are processed by respectively separate (low definition and high definition) systems, but are combined prior to transmission, in accordance with the degree of motion associated with each pixel. These separate systems are provided in the MUSE encoder and in the decoder of the TV receiver. Test broadcasts of this system are currently in progress. The MUSE system has been described in various documents in the past, for example in the Nikkei Electronics (Japan), Nov. 2, 1987, pages 189 to 212, in an article entitled "MUSE transmission system for High-Vision broadcasting using earth satellite", so that detailed description of the overall MUSE system will be omitted in the following.

At the transmitting end of such a broadcast system, an encoder processes the luminance and chrominance components of the HDTV signal to obtain the MUSE signal. The luminance (Y) signal compensation of the HDTV signal is first subjected to A/D conversion using a sampling frequency of 48.6 MHz. FIGS. 1A to 1D are diagrams for illustrating the frequency spectrum that is obtained at various stages of conversion of the original luminance signal to that of the MUSE signal. FIG. 1A shows the original frequency spectrum of the luminance component of the HDTV signal, which has a bandwidth extending from 0 to approximately 22 MHz. Next, inter-field offset sampling is executed, with the resultant frequency spectrum being as shown in FIG. 1B. The static image components of the resultant signal are then subjected to sampling frequency conversion, to change the sampling frequency to 32.4 MHz, then inter-frame offset sampling is applied, to obtain the frequency spectrum shown in FIG. 1C.

The image motion components are limited to a bandwidth of 16.2 MHz, then sampling frequency conversion is executed to a sampling frequency of 32.4 MHz, followed by line offset sub-sampling, with the resultant frequency spectrum being as shown in FIG. 1D.

Respective sample values (i.e. pixel values) of the signal obtained by thus processing the static image components and the signal obtained by processing the moving image components are then combined, one pixel at a time, with the combining proportions being determined by an amount of image motion that has been detected for the image region in which each pixel is located. The resultant signal is then subjected to D/A conversion to obtain an analog signal, which is transmitted (multiplexed together with various synchronizing and control signals) as the MUSE signal. Detection of motion of regions within the field that is currently being processed by the MUSE encoder is executed by a motion detector circuit, for each pixel, based for example upon the magnitude of an absolute value of amplitude change between that pixel in the current field and the corresponding pixel of the preceding field. With a MUSE encoder, a static component processing system is used to process pixels which are within a static region of a field (i.e. which are unchanged in absolute amplitude with respect to corresponding pixels of preceding fields), while a motion component processing system processes pixels which are within a moving region of a field. Output signals from the static component processing system and motion component processing system are combined, one pixel value at a time as described above, in accordance with amounts of movement detected by a motion detection circuit.

In addition to such detection of motion of regions within a field, the MUSE encoder also detects overall motion of the picture conveyed by the current field, such as motion resulting from panning or tilting of a television camera. Such overall motion will be referred to in the following simply as panning motion, while motion of individual regions within a picture will be referred to as area motion. When such panning motion begins, motion vector data expressing the amount and direction of panning motion between each field and the preceding field (inter-field), and also between each field and the corresponding field of the preceding frame (inter-frame) are encoded and transmitted together with the image data of the field, as part of the control signals of the MUSE signal. At the MUSE encoder of the television receiver, the motion vector data are used as described hereinafter to ensure that loss of picture definition does not occur in picture regions which are static (but which exhibit apparent motion due to panning).

As shown in FIGS. 1C and 1D, the high frequency components of the original signal of FIG. 1A are "folded over" to fall within a bandwidth of 8.1 MHz, whereby the transmission spectrum bandwidth is compressed to within 8.1 MHz. Such a bandwidth-compressed MUSE signal is received and demodulated by a HDTV receiver which contains a MUSE decoder.

FIG. 2 is a diagram illustrating the sequence of sample values in the MUSE signal. As shown, sample values in lines of an even-numbered field of a frame are identical in phase to those of the odd-numbered field of that frame, and the sample values of each line are displaced by 180° relative to the sample values of the corresponding line of the succeeding frame. In addition, the sample values in successive lines of a field are alternately phase shifted by 180°. It can be understood that the sample positions of each line will coincide with those of the corresponding line of a field that occurred two frame intervals previously.

FIG. 4 is a general circuit block diagram of an example of a prior art MUSE decoder for use in a HDTV receiver. In FIG. 4, only the circuit portions concerned with luminance (Y) signal processing are shown, with the components which deal with chrominance signal processing being omitted for simplicity of description. The received MUSE signal is applied to an input terminal 1, then inputted to an A/D converter circuit 2 in which it is resampled using a sampling frequency of 16.2 MHz, to be converted to a digital signal. The output signal from the A/D converter circuit 2 is supplied to a de-emphasis circuit 3, whose output is supplied to a noise reducer circuit 4, in which noise components of the received MUSE signal are attenuated. The output signal from the noise reducer circuit 4 is supplied to an inter-frame interpolation circuit 5. The inter-frame interpolation circuit 5 is formed of a changeover switch 6 and a 1-frame delay/motion compensation circuit 7, and serves to execute inter-frame interpolation of sample values (i.e. into positions in the signal from which samples have been eliminated by the MUSE encoder). The inter-frame interpolation is executed as follows. The signal of the current field (i.e. the field of the received MUSE signal that is currently being inputted to the inter-frame interpolation circuit 5) is applied via terminal 6a of the changeover switch 6, in alternation with the signal of the corresponding field of the preceding frame (i.e. last field but one) from the output of the 1-frame delay/motion compensation circuit 7, transferred via contact 6b of the changeover switch 6, to the input of the 1-frame delay/motion compensation circuit 7. The switching operations of the changeover switch 6 are in units of pixels, under the control of an inter-frame subsampling clock signal S1 (at a frequency of 16.2 MHz), which expresses sample point and interpolation point phase information. As a result, for each line of the current field, samples from the corresponding line of the corresponding field of the preceding frame (i.e. the last field but one) are interpolated into the appropriate positions. This can be understood from the diagram of FIG. 3 which shows three successive lines of a field of the output signal from the inter-frame interpolation circuit 5. The output digital MUSE signal from the de-emphasis circuit 3 has a sampling frequency of 16.2 MHz, so that an output signal having a sampling frequency of 32.4 MHz is obtained from the inter-frame interpolation circuit 5 as a result of this interpolation.

With a MUSE signal, as described above, the sample positions within each field are identical to those of the field which precedes it by two frame intervals, i.e. there is a high degree of correlation between the current MUSE signal and the MUSE signal of 2 frames previously. This fact is made use of by the noise reducer circuit 4, which executes noise reduction based on correlation between the output signal from the de-emphasis circuit 3 and the output signal from the 1-frame delay/motion compensation circuit 7 which has been passed through the 1-frame delay/motion compensation circuit 7 twice in succession, and therefore has been delayed by two frame intervals.

As described hereinafter, the 1-frame delay/motion compensation circuit 7 within the inter-frame interpolation circuit 5 also serves to execute inter-frame motion vector compensation, and provides a delay of exactly one frame interval only when no motion vector compensation is in progress. The motion vector compensation is controlled by horizontal and vertical motion vector signals which are collectively indicated as M1 in FIG. 4 and are separated from other control signals contained in the MUSE signal, by the control signal separator circuit 19.

The output signal from the inter-frame interpolation circuit 5 is supplied to a static component processing circuit 8 and (via a selector switch 13a) to a motion component processing circuit 9. The static component processing circuit 8 is made up of a LPF 10, a sampling frequency conversion circuit 11 and an inter-field interpolation circuit 12. The interpolated output signal produced from the inter-frame interpolation circuit 5 is transferred through the LPF 10, which has a cut-off frequency of 12 MHz, and the resultant signal is then resampled in the sampling frequency conversion circuit 11, to execute conversion of the sampling frequency from 32.4 MHz to 24.3 MHz. The output signal from the sampling frequency conversion circuit 11 is then supplied to the inter-field interpolation circuit 12, in which inter-field interpolation processing and inter-field motion vector compensation is executed to obtain an output signal having a sample rate of 48.6 MHz. This inter-field interpolation operation is controlled by an inter-field subsampling clock signal S2 (at a frequency of 24.3 MHz) that is produced from an inter-field sampling control circuit 21. The inter-field motion vector compensation is controlled by horizontal and vertical motion vector signals, collectively designated as M3, outputted from the control signal separator circuit 19. Although circuit 8 is designated as the static component processing circuit, in fact the overall static component processing system is made up of the inter-frame interpolation circuit 5 and the static component processing circuit 8, since only a part of the output signal from the inter-frame interpolation circuit 5 is supplied to the motion compensation processing circuit 9 as described hereinafter.

The effect of this static component processing system is to produce an output signal from the inter-field interpolation circuit 12 in which each field consists of a superimposed combination of four successive fields of the MUSE signal, i.e. the current field and the three preceding fields. This ensures that a high degree of resolution can be obtained for stationary regions of the finally obtained display picture.

The output signal from the changeover switch 6 of the inter-frame interpolation circuit 5 is also supplied via the switch 13a to the motion component processing circuit 9. The switch 13a is controlled by the aforementioned inter-frame subsampling clock signal S1 produced from the inter-frame sampling control circuit 20, such as to select from the output signal of the changeover switch 6 only the sample values of the current field (i.e. the field whose signal is currently being inputted to the inter-frame interpolation circuit 5, rather than delayed signal produced from the 1-frame delay/motion compensation circuit 7). Thus the input signal to the motion component processing circuit 9 can be considered to be equivalent to the output signal from the de-emphasis circuit 3, but with noise reduction processing having been applied. This process can be understood by referring again to FIG. 3, in which the relationship between the inter-frame subsampling clock signal S1 and three successive lines of the output signal from the inter-frame interpolation circuit 5 is illustrated. As shown, the inter-frame subsampling clock signal S1 changes in phase by 180° on successive lines. Each time that the inter-frame subsampling clock signal S1 is at the H logic level, the switch 13a transfers a sample value of the output signal from the inter-frame interpolation circuit 5 to the motion component processing circuit 9. It can be understood that the timing of the inter-frame subsampling clock signal S1 is determined such that only those sample values which come from the current field (i.e. have not yet passed through the 1-frame delay/motion compensation circuit 7) are selected to be transferred to the motion component processing circuit 9. The motion component processing circuit 9 is made up of a intra-field interpolation circuit 13 and a sampling frequency conversion circuit 14, with the output signal from the switch 13a being inputted to the intra-field interpolation circuit 13. The resultant intra-field interpolated signal produced from the intra-field interpolation circuit 13 has a sampling frequency of 32.4 MHz, and is transferred to the sampling frequency conversion circuit 14 to be converted to a signal having a sampling frequency of 48.6 MHz.

The output signals from the static component processing circuit 8 and motion component processing circuit 9 are supplied to a signal combiner circuit 15, and are combined therein in respective proportions which are controlled by a motion detection signal that is produced from a motion detection circuit 22. More specifically, for each pixel (sample value) of the current field that is being outputted from both the static component processing circuit 8 and the motion component processing circuit 9, if for example a relatively large amount of motion is detected by the motion detection circuit 22 for that pixel (i.e. indicating that the pixel forms part of a moving region within the current field), then the output value for that pixel produced from the static component processing circuit 8 is multiplied by a relatively small factor in the signal combiner circuit 15, while the output value for that pixel produced from the motion component processing circuit 9 is multiplied by a relatively large factor, and the results are summmed and outputted from the signal combiner circuit 15 as the sample value for that pixel.

The motion detection circuit 22 is configured such as to detect only area motion within a field, and not to respond to uniform (panning) motion of the picture conveyed by a field.

The output signal from the signal combiner circuit 15 is supplied to a low-frequency replacement circuit 17, which replaces a fixed proportion of the low frequency components (i.e. in the range of approximately 0 to 3 MHz) of the output signal from the signal combiner circuit 15 with a corresponding proportion of the low frequency components within that same frequency range from the output signal of the de-emphasis circuit 3. The resultant output signal from the low-frequency replacement circuit 17 is transferred to an output terminal 18, as the output luminance signal from the MUSE decoder.

The output signal from the A/D converter 2 is also supplied to a control signal separator circuit 19, which separates the motion vector signals M1 and M3 from motion vector data contained in the control signal portion of the MUSE signal, and outputs signals M1 and M3 from output terminals 19a, 19d respectively. In addition, the control signal separator circuit 19 separates an inter-frame subsampling control signal, which expresses inter-frame subsampling phase information, from the control signals of the MUSE signal, and transfers that signal from an output terminal 19b. The control signal separator circuit 19 further separates an inter-field subsampling control signal, which expresses inter-field subsampling phase information from the control signals of the MUSE signal, and transfers that signal from an output terminal 19c.

The motion vector signals M1 are supplied to the 1-frame delay/motion compensation circuit 7, for applying motion vector compensation. The inter-frame subsampling control signal from output terminal 19b of the control signal separator circuit 19 is supplied to the inter-frame sampling control circuit 20, for controlling generation of the inter-frame subsampling clock signal S1 based on a 16.2 MHz clock signal that is also inputted to the inter-frame sampling control circuit 20. That 16.2 MHz clock signal and also the 24.3 MHz clock signal which is supplied to the circuit 21 are each generated from a clock signal generating circuit (not shown in the drawing) whose operation is phase-locked with the output signal from the A/D converter circuit 2. The inter-field subsampling control signal from output terminal 19c of the control signal separator circuit 19 is supplied to the inter-field sampling control circuit 21, for controlling generation of the inter-field subsampling clock signal S2 based on the aforementioned 24.3 MHz clock signal.

The output signal from the de-emphasis circuit 3 is also supplied to the motion detection circuit 22 which serves to detect, for each pixel of the current field, motion with respect to one or more preceding fields. For accuracy of detection, this will in general be based on a plurality of preceding fields, in order to counteract effects upon the motion detection of the differing sample positions (i.e. offset) between successive fields of the MUSE signal. However even if that is done, it is impossible to achieve as high a degree of accuracy and reliability of motion detection for the motion detection circuit 22 as that of the motion detection circuit of the MUSE encoder apparatus, which operates on sample values that have not yet been "thinned-out" and offset in position.

In the decoder, each field of the output signal from the static component processing circuit 8 is derived by combining the current field and the three preceding fields. When the picture contains panning motion, i.e. uniform overall picture motion, high resolution of static picture regions (i.e. static other than for the panning motion) is ensured by phase shifting all of the pixels of each field by an amount and in a direction such as to compensate for the panning motion, to ensure that the successively combined fields will have identical values of image phase, and so obtain maximum resolution for such static picture regions during panning motion. The intra-frame motion vector compensation is applied as follows. The amount of intra-frame motion vector compensation that is applied by the 1-frame delay/motion compensation circuit 7, in the horizontal and vertical directions, is determined by the motion vector signals M1. During the current field, the motion vector signals M1 represent the amount of motion vector compensation that is to be applied to the corresponding field of the preceding frame (i.e. that is to be applied to a signal obtained by delaying the signal of the current field by exactly one frame interval), so that the current field is used as a reference field for this compensation.

FIG. 6A shows an example of the internal configuration of the 1-frame delay/motion compensation circuit 7 of FIG. 4. The output signal from the changeover switch 6 (obtained by interpolation of sample values from the corresponding field of the preceding frame into the current field) is applied to an input terminal 23, then through a fixed delay element 24 (e.g. a delay line unit) to a multi-stage delay section 25. This consists of a plurality of delay elements, each providing a delay of 1 H (i.e. one horizontal scanning period). The outputs from the respective stages of the delay section 25 are applied to respective input terminals of a selector switch 26. The switch 26 selects the output from one of these stages of the delay section 25 under the control of a vertical motion vector signal (which is one of the motion vector signals M1) that is applied to an input terminal 27. Thus, an amount of delay (phase shift) in the vertical scanning direction of the television picture is applied, in accordance with the value of the vertical motion vector signal. The output signal from the switch 26 is applied to a shift register circuit 28, with respective outputs from the stages of the shift register circuit 28 being supplied to corresponding input terminals of a selector switch 29. The selector switch 29 selects an output from one of the stages of the shift register circuit 28 (i.e. determines an amount of phase shift applied in the horizontal direction of the television picture) in accordance with the value of a horizontal motion vector signal (the other one of the motion vector signals M1) that is applied to an input terminal 30. The horizontal phase shifting is executed in units of pixel periods, i.e. $10^{-6}/16.2$ sec.

The resultant motion vector corrected output signal is transferred from an output terminal 31 to the input terminal 6b of the changeover switch 6. When motion vector processing is not being executed (i.e. while the motion vector signals are each at the zero level), the circuit of FIG. 6 is configured such that the total amount of delay between the input terminal 23 and the output terminal 31 is exactly one frame interval. The multi-stage delay circuit 25 in the example of FIG. 5 has a total of 8 stages, and the shift register 28 has 16 stages, e.g. allowing vertical phase shifting in a range of from $+4$ lines to $-3$ lines, and horizontal phase shifting in a range of $+8$ to $-7$ sample positions.

FIG. 6B illustrates the internal configuration of the inter-field interpolation circuit 12 of FIG. 4. The phase shifting section 82 consists of the blocks 25, 26, 28, 29 shown in FIG. 6A, however the value of the fixed delay provided by delay element 80 is such that a delay of exactly one field interval is produced between the input terminal 81 and the output from the phase shifting circuit 82 when each of the horizontal and vertical motion vector signals is at the zero level. An inter-field interpolation filter 85 receives the input signal of the 1-field delay element 80 and the output signal from the phase shifting circuit 82, and is controlled by the clock signal S2. The output signal from the inter-field interpolation filter 85 is supplied to the combiner circuit 15 of FIG. 4.

The basic operation of the static component processing system in FIG. 4 is as follows. Considering four successive fields of the MUSE signal, designated as $n_1$, $n_2$, $n_3$ and $n_4$, with $n_4$ being the current field, the field $n_3$ is first combined with the delayed field $n_1$ in the inter-frame interpolation circuit 5, after any necessary inter-frame motion vector phase shifting has been applied to the field $n_1$ in the 1-frame delay/motion compensation circuit 7. The resultant first combined field is transferred to the inter-field interpolation circuit 12, the same process is executed for fields $n_2$ and $n_4$ (with phase shifting for motion vector compensation being applied to field $n_2$) to obtain a second combined field, then the first and second combined fields are combined in the inter-field interpolation circuit 12, after phase shifting for any necessary inter-field motion vector compensation has been applied to the first combined field. The resultant signal of the combined field from the inter-field interpolation circuit 12 is then transferred to the signal combiner circuit 15, and if any sample value of that signal is found to be part of a moving region, then the value is partially or completely replaced by a sample value which is being produced from the motion compensation processing circuit 9 at that time.

However with the prior art decoder apparatus of FIG. 4, a problem arises when the motion detection circuit 22 exhibits detection errors, or has insufficient accuracy of detection. For example, taking the simplest case in which a single region of the picture is in motion, the pixels of that region will be obtained (i.e. as the output signal from the signal combiner circuit 15) mainly from the output signal of the motion component processing circuit 9, if accurate motion detection is achieved by the motion detection circuit 22. However if the motion detection circuit 22 fails to detect this area motion, then each pixel of the moving region in the output signal from the decoder will be derived (via the signal combiner circuit 15) from the output signal of the static component processing circuit 8. In actual practice, the motion detection circuit 22 may only detect the motion of that region intermittently. When that occurs, the pixels of the region will be correctly derived from the motion component processing circuit 9 output signal during some fields of the output signal from the signal combiner circuit 15, and incorrectly derived from the output signal of the static component processing circuit 8 during other fields. This will result in an unnatural flickering movement of such a moving region on the displayed picture that is obtained, which is conspicuous and objectionable. Such intermittent detection errors by the intra-field interpolation circuit 13 are liable to occur when there is a change in the speed of a moving region within the picture.

As stated hereinabove, it is extremely difficult to achieve accurate operation of the motion detection circuit 22, since the input signal of that circuit consists of sample values which are offset between successive frames. FIGS. 7A, 7B are conceptual timing diagrams for describing the effects of such errors in detecting motion of regions. The vertical lines $n_1$, $n_2$, $n_3$, $n_4$ represent four successive fields of the input MUSE signal, and the differences between these line positions along the time axis correspond to successive positions of an arbitrary region within the fields. These time axis positions will be referred to as respective image phase values, which are mutually separated by one field interval. $n_4$ will be assumed to be the current field, $n_3$ the immediately preceding field, $n_2$ the last field but one, and so on. The effect of the static image processing system made up of the inter-frame interpolation circuit 5 and static component processing circuit 8 is to generate each field of the output signal from the static component processing circuit 8 as a combination of four successive fields of the input MUSE signal, i.e. each output field represents an image that is a combination of the images expressed by the four fields $n_1$ to $n_4$. Thus the image phase of that output field from the static component processing circuit 8 will correspond to a position that is midway between those of $n_2$ and $n_4$, along the time axis, as indicated in FIG. 7A. If it is assumed that a single moving region exists in the picture expressed by these fields, i.e. is contained in each of these four fields, then the central position of that moving region, as it appears within the picture expressed by the output combined field produced from the static component processing circuit 8, will be midway between the positions of that region in fields $n_2$ and $n_3$, i.e. will have an image phase that is midway between $n_2$ and $n_3$. If there is failure to detect that moving region by the motion detection circuit 22, then the region will appear in the resultant displayed picture as a set of pixels that have been outputted from the static component processing circuit 8. On the other hand, if that moving region is detected correctly by the motion detection circuit 22, so that the corresponding portion of the output field from the signal combiner circuit 15 is derived from the output signal of the motion component processing circuit 9, then the corresponding image phase will be that of $n_4$. This is displaced from the aforementioned central image phase position by 1.5 field intervals, as shown in FIG. 7A, so that there will be a difference between the position of the moving region in the output field from the signal combiner circuit 15 in that case, by comparison with the case in which the pixel data for the moving region are derived from the static component processing circuit 8. The amount of that position difference will of course depend upon the speed of motion of the moving region. However if the motion detection circuit 22 achieves correct motion detection in an intermittent manner, as often occurs in practice, then the moving region will appear to move in an unnatural manner, conspicuously jumping forward or backward for example, in the displayed picture that is obtained. This has been a serious problem in the prior art.

It might be thought that this problem could be easily overcome by simply delaying the input signal applied to the motion component processing circuit 9 by one frame interval, i.e. to input the field $n_2$ to the motion component processing circuit 9 rather than the current field $n_4$. If that were done, then as indicated in FIG. 7A, the amount of image phase difference could be reduced to half of a field interval, i.e. the timing difference between the central phase value (indicated by the vertical broken line) and that of field $n_2$. However although this could be done if only processing of static regions and moving regions were executed, without motion vector compensation, in fact it is not a practical solution, since it is ineffective while panning motion of the displayed picture is in progress.

This will be described referring to FIG. 7B. Specifically, when motion vector compensation is applied, the effect is to bring the field $n_1$ into image phase coincidence with field $n_3$, and to bring field $n_2$ into image phase coincidence with field $n_4$, then to bring the resultant field $n_3$ into image phase coincidence with the resultant field $n_4$, as indicated by the curved arrows in FIG. 7B. In that case, the image phase of a resultant field (a combination of four successive fields) that is outputted from the static image processing system, i.e. from the static component processing circuit 8, will be that of field $n_4$. Thus, if the aforementioned 1-frame delay were to be applied to the input signal of the moving-image processing system, i.e. to input the field $n_2$ rather than the current field $n_4$, then the same problem would arise. In that case, the image phase of the aforementioned moving region as represented in the output signal from the motion component processing circuit 9 (that of field $n_2$, with no motion vector compensation having been applied) will be significantly different from that of the same moving region as represented in the output signal from the static component processing circuit 8 (having the image phase of field $n_4$). Thus, simply supplying a 1-frame delayed signal to the motion component processing circuit 9 will not solve the problem.

The above points can be more clearly understood from the pictorial examples of FIGS. 8A and 8B. In FIG. 8A, 63 denotes the current field $n_4$, and 60 to 62 denote the three preceding fields $n_1$ to $n_3$, with the picture expressed by each field containing a fixed region 65 (i.e. part of a stationary background) and a moving region 66, and with the moving region 66 moving horizontally relative to the fixed region 65 in successive fields as illustrated. When these are combined by inter-frame and inter-field interpolation as described above, the picture represented by the resultant combined field will be as indicated by numeral 64. The respective stationary regions of fields $n_1$ to $n_4$ are thereby combined to obtain the static region 65'. If the moving region 66 is correctly detected by the motion detection circuit 22, then the pixels representing that region will be obtained from the motion component processing circuit 9, and inserted into the combined field 64, and the resultant region will appear as indicated by 66b. However if motion detection failure occurs, then a combined region determined by the respective positions of the moving region 66 in the fields $n_1$ to $n_4$ will be obtained as pixels derived from the static component processing circuit 8, appearing as indicated by 66a in the combined field 64. The center position 67 of that region is substantially displaced from the center position 68 of the region 66b.

FIG. 8B illustrates the case in which horizontal panning in the direction indicated by the arrow has occurred, so that a fixed region 75 moves horizontally in successive ones of the fields $n_1$ to $n_4$. At the same time, a moving region 76 is moving relative to the fixed region 75, in a similar manner to the relationship between regions 66 and 65 in FIG. 8A. When these are combined, with motion vector compensation applied as described hereinabove, the position 75' of the fixed region 75 will be that of the region as it appears in the current field $n_4$, i.e. field $n_4$ constitutes the image phase reference field as described above. If the moving region 76 is correctly detected by the motion detection circuit 22, then that region will appear at position 76b in the combined field 75'. If failure of motion detection occurs, then the successive positions of the moving region 76 relative to the fixed region 75 in fields $n_1$ to $n_4$ will result in the extended region 76a appearing in the combined field 74, representing that moving region. If on the other hand the input signal to the motion component processing circuit 9 had been delayed by one frame interval, i.e. if signal $n_2$ had been used as the input signal to the motion component processing circuit 9, then the moving region 76 would appear at position 76c in the combined field 74. As can be seen, the center position 76c in that case is substantially different from that of the combined region 77, so that no advantage would be gained by this.

It can thus be understood that the above problem resulting from detection errors of the motion detection circuit 22 does not have a simple solution. That is the first problem of the prior art to be overcome by the present invention.

A second problem which arises with the prior art MUSE decoder is a result of the first problem described above. That is to say, the inter-field interpolation circuit 12 will in practice consist of a combination of a 1-field delay element which receives the output signal from the sampling frequency conversion circuit 11, and a digital filter circuit for combining the input and output signals of the 1-field delay element, to execute inter-field interpolation under the control of the inter-field subsampling clock signal S2. Ideally, that digital filter circuit should be a 2-dimensional type of filter (e.g. formed of a vertically extending array of transversal filters whose output signals are summed), with the filter coefficients being determined such as to provide a 2-dimensional filter response which falls linearly from a maximum value of vertical resolution at low values of horizontal frequency, i.e. less than 4 MHz, to zero at a horizontal frequency of approximately 24.3 MHz. However if such a 2-dimensional digital filter were to be used as the inter-field interpolation circuit 12, the aforementioned adverse effects which result in the finally obtained picture as a result of erroneous operation of the motion detection circuit 22 will be made more conspicuous, due to the high resolution. For that reason, a simple one-dimensional filter is used in the inter-field interpolation circuit 12 in the prior art, which provides a substantially flat 2-dimensional response characteristic of the form indicated by the hatched-line region (1) in FIG. 5. In FIG. 5, the vertical resolution provided by the filter is expressed as a "vertical frequency" in units of cycles/(TV) picture height, where "cycles" signifies transitions between successive scan lines of a picture. Such a 2-dimensional filter characteristic provides substantially constant, low vertical resolution from a horizontal frequency of zero up to the cut-off frequency of 24.3 MHz, as shown. However ideally, such a filter should provide a substantially higher degree of vertical resolution within a range of low frequencies which correspond to the regions of the frequency spectrums shown in FIGS. 1A, 1B in which there is little-or no "folding over" of the spectrum, i.e. in the (horizontal) low-frequency range of approximately 0 to 4 MHz. To achieve that in a practical MUSE decoder circuit, while avoiding the aforementioned problems that prevent the use of a 2-dimensional filter which would provide enhanced vertical resolution in that low-frequency range, a simple transverse filter is used in the inter-field interpolation circuit 12. That filter determines the overall 2-dimensional response in conjunction with the low-frequency replacement circuit 17, which replaces part of the low-frequency components of the output signal from the signal combiner circuit 15 with low-frequency components of the output signal from the de-emphasis circuit 3. Since that output signal from the de-emphasis circuit 3 has not been subjected to filtering in the inter-field interpolation circuit 12, the vertical resolution of the output signal from the low-frequency replacement circuit 17 within the aforementioned low-frequency range is enhanced, as indicated by the hatched-line region (2) in FIG. 5. Moreover, since the direct output signal from the de-emphasis circuit 3 has not been derived based on the operation of the signal combiner circuit 15 controlled by the motion detection signal from the motion detection circuit 22, the effects of detection errors by the motion detection circuit 22 upon the finally obtained output signal from terminal 18 are reduced.

However since the output signal from the de-emphasis circuit 3 has not yet been subjected to noise reduction (in the noise reducer circuit 4) or to sample value interpolation, the frequency component replacement operation of the low-frequency replacement circuit 17 results in increased noise and degraded horizontal resolution of the finally obtained television picture. Thus, increasing the proportion of the low frequency components of the output signal from the static component processing circuit 8 that are replaced by low frequency components of the output signal from the de-emphasis circuit 3 will result in increased vertical resolution in that low frequency range, but in a lowering of the S/N ratio of the output signal thus obtained. On the other hand, decreasing the proportion of the low frequency components of the output signal from the static component processing circuit 8 that are replaced by low frequency components of the output signal from the de-emphasis circuit 3 will result in the opposite effects, i.e. lowered vertical resolution in that low frequency range, but an improved S/N ratio of the output signal produced from the low-frequency replacement circuit 17.

It is therefore a basic disadvantage of such a prior art MUSE decoder apparatus that, as a result of the need to use a simple type of filter circuit to execute inter-field interpolation, it is extremely difficult to obtain a satisfactory degree of vertical resolution together with satisfactory values of noise level and horizontal resolution in the finally obtained television picture. This is a second problem of the prior art to be overcome by the present invention.

SUMMARY OF THE INVENTION

It is an objective of the present invention to overcome the disadvantages of the prior art as set out above. Specifically, a MUSE decoder apparatus according to the present invention operates as follows, in order to overcome the above problems. Motion vector compensation is applied to bring the image phase of the current field of the digitally converted MUSE signal into coincidence with that of a field which occurs m/2 field intervals prior to the current field (where m is an even integer having a value of 4 or greater). In addition, the signal that is inputted to the motion component processing system (i.e. corresponding to the switch 13a and the motion component processing circuit 9 in the prior art example described above) is that of a field occurring m/2 field intervals prior to the current field, and so has an image phase that is substantially identical to that of the signal that is processed by the static component processing system (i.e. the inter-frame interpolation circuit 5 and static component processing circuit 8 in the prior art example described above). As a result, when erroneous motion detection operation occurs, so that pixels which should represent a moving region of a picture are actually obtained from the output signal of the static component processing system, the aforementioned conspicuous unnatural motion which results in the finally obtained picture can be substantially eliminated, due to the very small amount of image phase difference between the output signals produced from the motion component processing system and the static component processing system respectively. The first problem of the prior art described hereinabove can thereby be overcome.

In addition, as a result of this reduced amount of image phase difference between the output signals produced from the motion component processing system and the static component processing system respectively, it becomes possible to use a 2-dimensional digital filter within the inter-field interpolation circuit 12 for sample interpolation, so that the 2-dimensional frequency response characteristic of that filter can be selected to provide the desired increase in vertical resolution in the aforementioned low-frequency range, without the need to use the low-frequency replacement circuit 17 of the prior art circuit. In this way, enhanced vertical resolution can be achieved, while maintaining a high level of S/N ratio and a high degree of horizontal resolution. The second problem of the prior art described hereinabove can thereby be overcome.

More specifically, the present invention provides a decoder apparatus for processing a transmitted television signal including image data sample values produced by inter-frame and inter-field offset sampling to achieve bandwidth compression and including, transmitted with each field of said television signal, and inter-frame and inter-field motion vector data expressing respective amounts of uniform picture motion of the field, said encoder apparatus comprising a motion component processing system for executing intra-field interpolation of successive fields, a static component processing system, area motion detection means for judging whether each of said sample values is part of a moving region within a picture expressed by a field, and combining means for combining respective output sample values produced from said motion component processing system and static component processing system in proportions determined by said area motion detection means to thereby output image sample values, in which said static component processing system comprises:

inter-frame interpolation and motion vector compensation means for combining a first one ($n_1$) of four successively received fields with a third one ($n_3$) of said fields after applying a fixed amount of phase shift to all sample values of said third field ($n_3$) in accordance with said inter-frame motion vector data, to thereby obtain a first combined field, and for combining a second one ($n_2$) with a fourth one ($n_4$) of said four fields after applying a fixed amount of phase shift to all sample values of said fourth field ($n_4$) in accordance with said inter-frame motion vector data, to thereby obtain a second combined field; and inter-field interpolation and motion vector compensation means for combinng said first combined field with said second combined field after applying a fixed value of phase shift to all sample values of said first combined field in accordance with said inter-field motion vector data, to thereby obtain a third combined field, with sample values of said third combined field being successively inputted to said combining means.

BRIEF DESCRIPTION OF THE DRAWINGS

FIGS. 8A, 8B are pictorial examples for illustrating image phase relationships between successive fields, with and without motion vector compensation, for the example of FIG. 4;

FIGS. 13A, 13B are diagrams for assistance in describing image phase relationships between successive fields, with motion vector compensation applied, for the embodiment of FIG. 9;

DESCRIPTION OF PREFERRED EMBODIMENTS

Figure 1A:
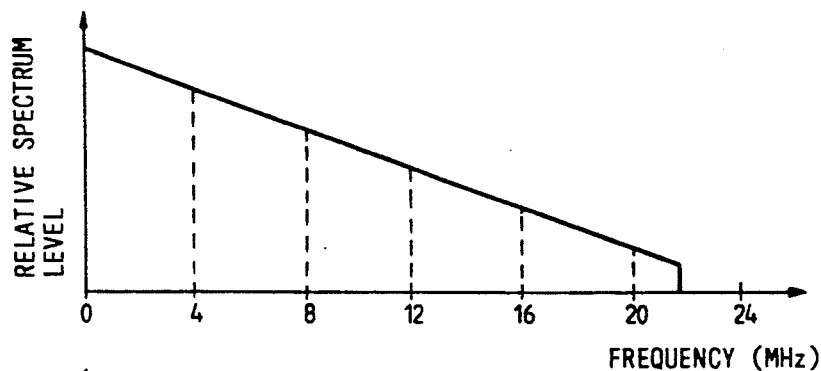
FIGS. 1A to 1D show frequency spectra obtained at various stages of deriving a MUSE signal.
Figure 1B:
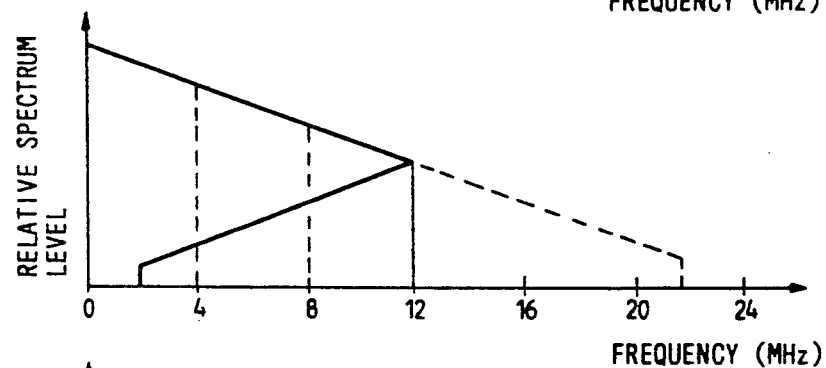
Figure 1C:
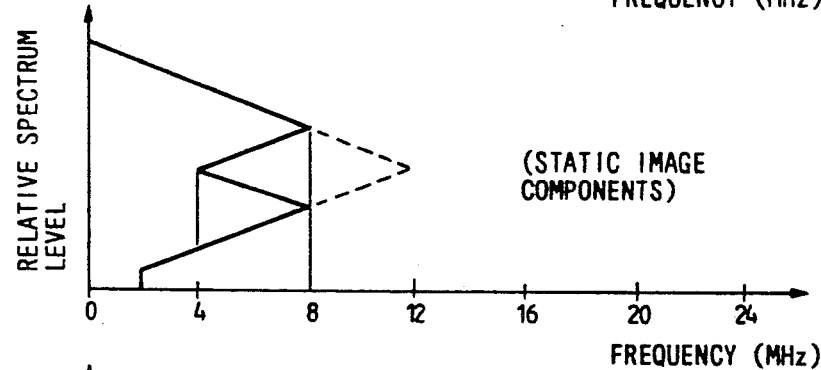
Figure 1D:
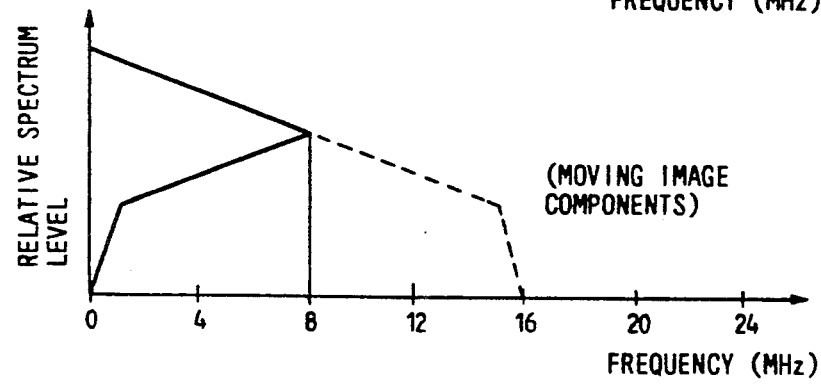
Figure 2:
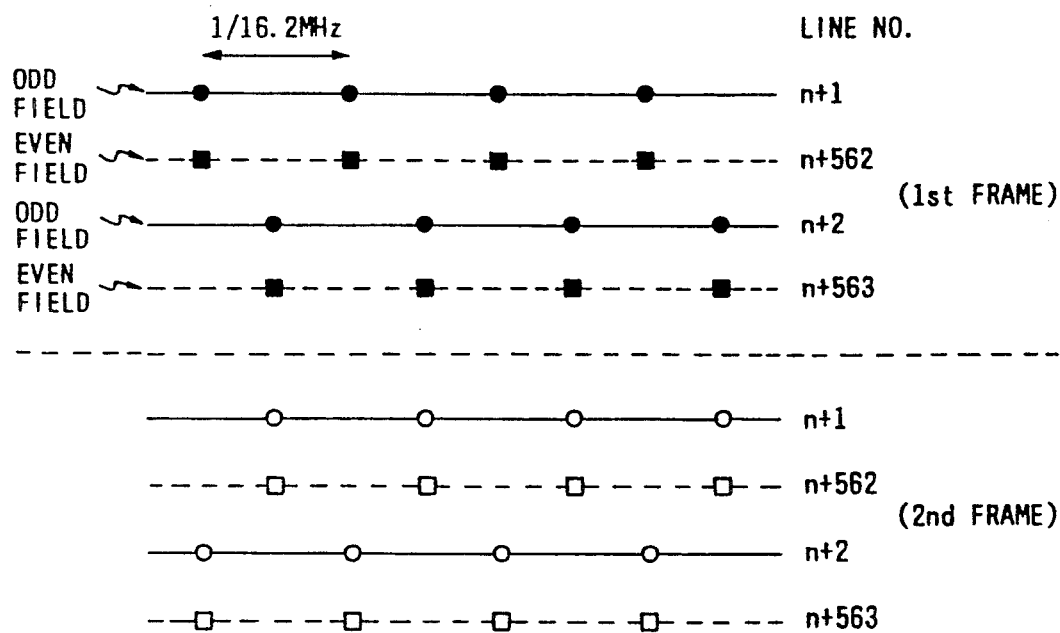
FIG. 2 is a timing diagram illustrating sample positions within a MUSE signal.
Figure 3:
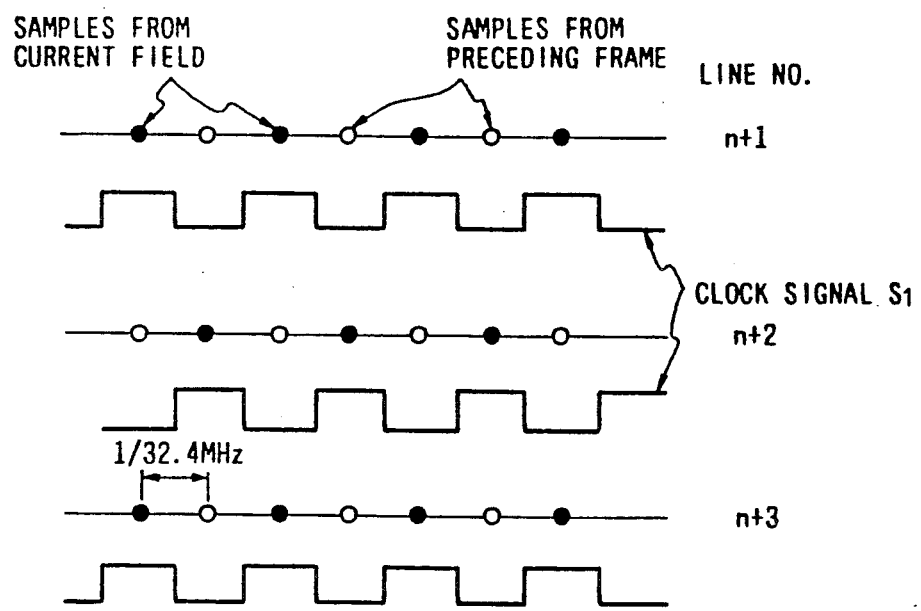
FIG. 3 is a timing diagram illustrating a signal produced by inter-frame interpolation in a MUSE signal decoder.
Figure 4:
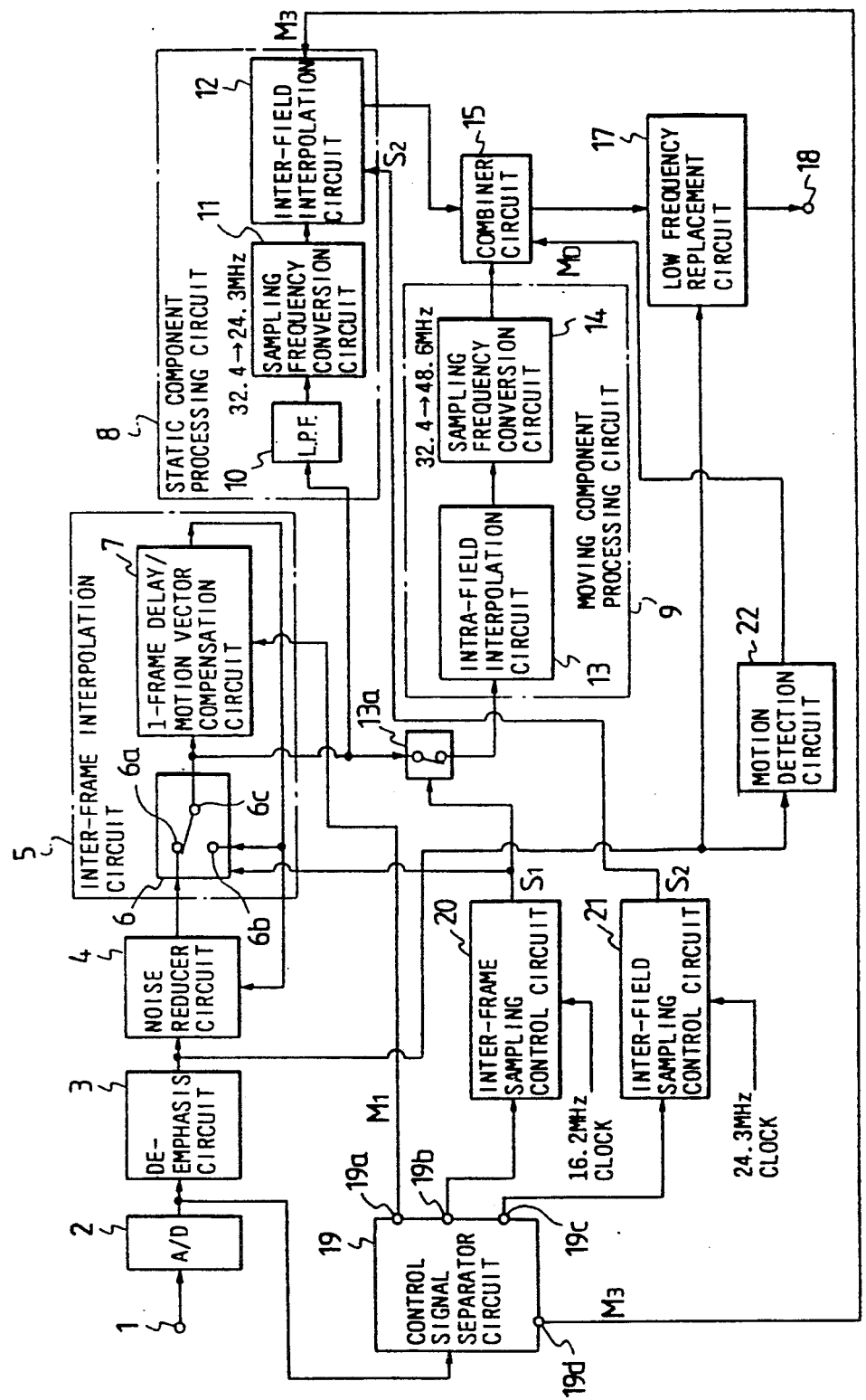
FIG. 4 is a circuit block diagram of an example of a prior art MUSE signal decoder apparatus for use in a HDTV television receiver.
Figure 9:
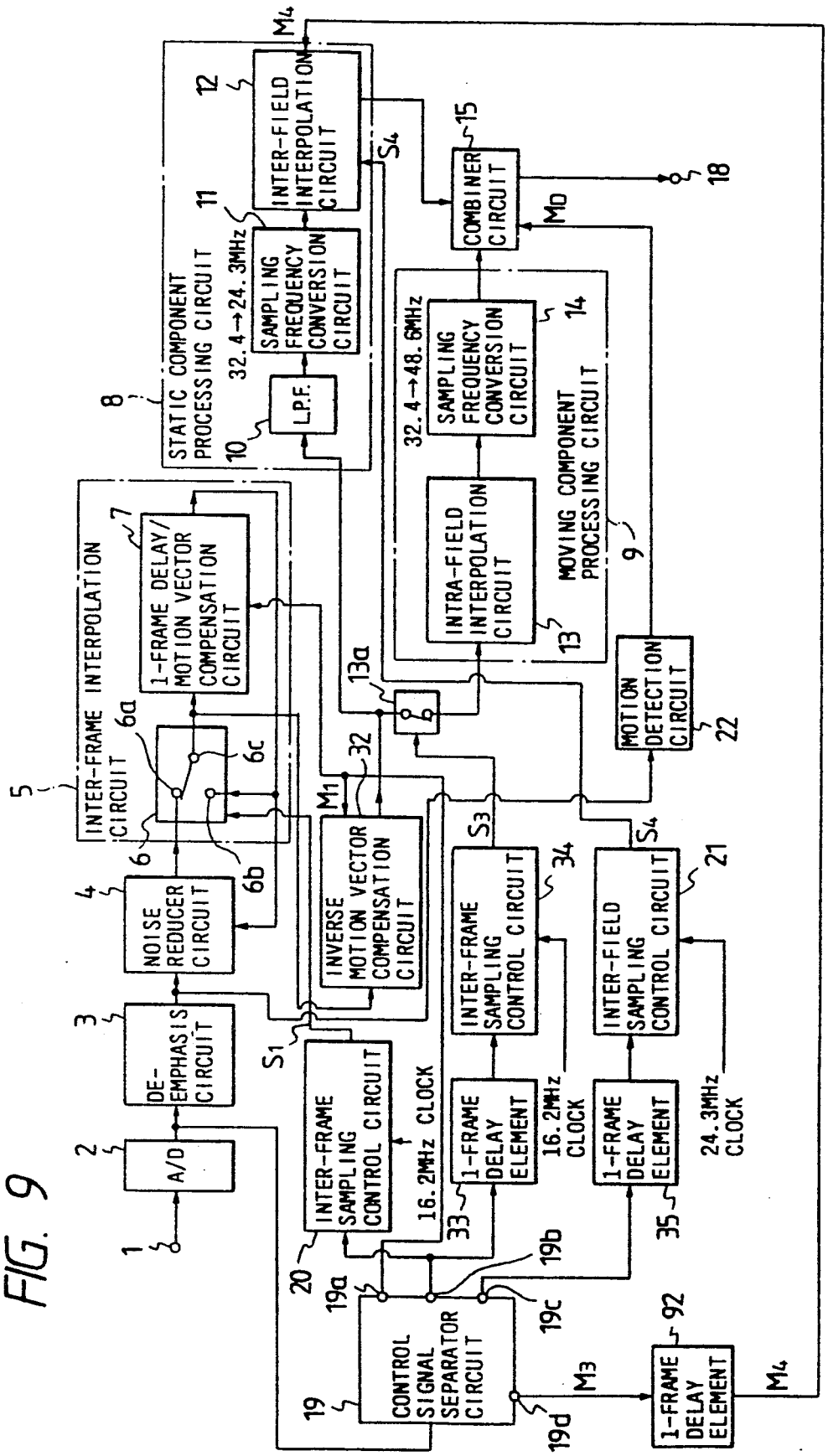
FIG. 9 is a circuit block diagram of a first embodiment of a MUSE decoder apparatus according to the present invention for a HDTV receiver.

FIG. 9 is a general circuit block diagram of a first embodiment of a MUSE decoder apparatus according to the present invention. Components within FIG. 9 which correspond to components in the prior art circuit of FIG. 4 described hereinabove are designated by corresponding reference numerals, and detailed description of these will be omitted. The points of difference between the embodiment of FIG. 9 and the prior art example of FIG. 4 are as follows. In FIG. 9, a inverse motion vector compensation circuit 32 is added, for applying motion vector compensation in the opposite direction to that applied by the 1-frame delay/motion compensation circuit 7, as described hereinafter. The output signal from the inverse motion vector compensation circuit 32 is supplied to the static component processing circuit 8 and motion component processing circuit 9, in place of the output signal from the inter-frame interpolation circuit 5. In addition, the low-frequency replacement circuit 17 of the prior art circuit of FIG. 4 is eliminated, and a 1-frame delay element 33 and a second inter-frame subsampling control circuit 34 are added, for generating an inter-frame subsampling clock signal S3, which is applied to control switching operation of the switch 13a. As a result, the inter-frame subsampling clock signal S3 differs by 180° in phase from the inter-frame subsampling clock signal S1 produced from the inter-frame sampling control circuit 20.

In the following, only the operation with respect to these additional components of the embodiment of FIG. 9 will be described in detail. The output signal from the changeover switch 6, as described hereinabove, is obtained by interpolation of sample values into the signal of the current field from the signal of the field which occurred m/2 field intervals previously, and is currently being outputted from the 1-frame delay/motion compensation circuit 7, i.e. with a fixed phase shift of m/2 field intervals having been applied thereto, and possibly with motion vector compensation having been applied thereto. It will be assumed in the following that the value of m is 4, so that motion vector compensation is applied by the static component processing circuit 8 to the signal of the field which occurred one frame interval prior to the current field.

The basic concept of this embodiment of the present invention is that when motion vector compensation is applied to the field signal of the preceding frame in this way by the 1-frame delay/motion compensation circuit 7, inverse motion vector compensation, i.e. of equal value but in the opposite direction is applied to that field signal by the inverse motion vector compensation circuit 32, thereby cancelling the motion vector compensation applied by the 1-frame delay/motion compensation circuit 7 to that field. More precisely, the motion vector compensation by the 1-frame delay/motion compensation circuit 7 and the inverse motion vector compensation by the inverse motion vector compensation circuit 32 are in that case applied to those sample values of the output signal from the inter-frame interpolation circuit 5 which have been interpolated into the current field from the field which occurred two field intervals previously. On the other hand, the sample values of the current field (transferred directly through the switch 6 to be outputted from the inter-frame interpolation circuit 5) are not subjected to the fixed (1-frame) phase shift and motion vector compensation by the 1-frame delay/motion compensation circuit 7, but are subjected to the inverse motion vector compensation by the inverse motion vector compensation circuit 32.

Figure 6A:
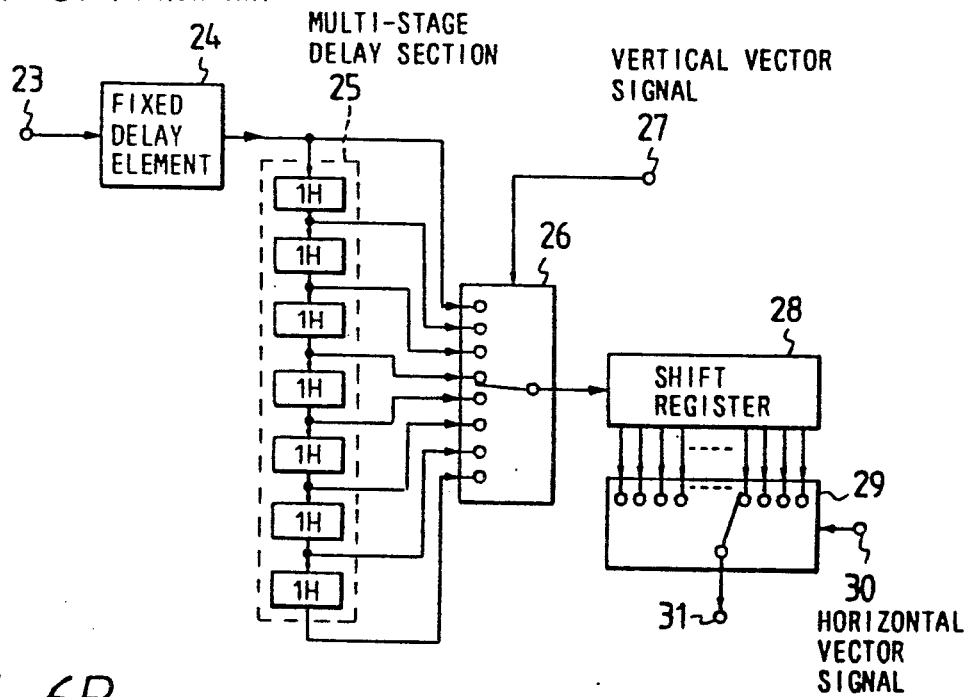
FIG. 6A is a circuit block diagram of a 1-frame delay and motion vector compensation circuit in the example of FIG. 4.
Figure 6B:
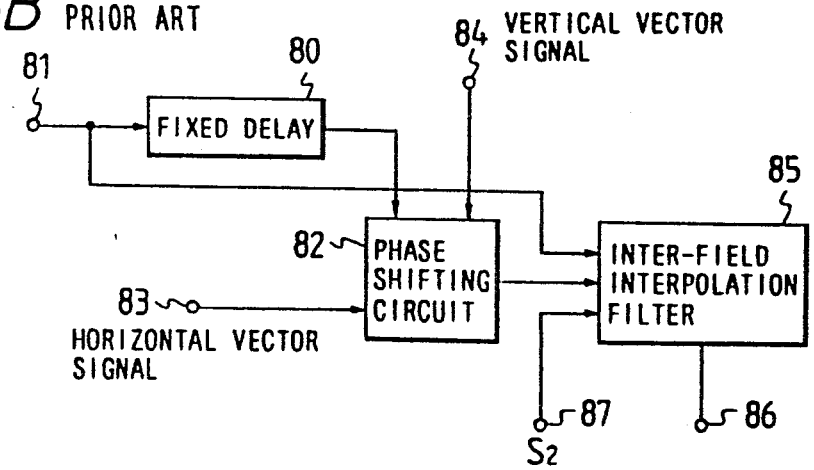
FIG. 6B is a circuit block diagram of an inter-field interpolation circuit in the example of FIG. 4.
Figure 10:
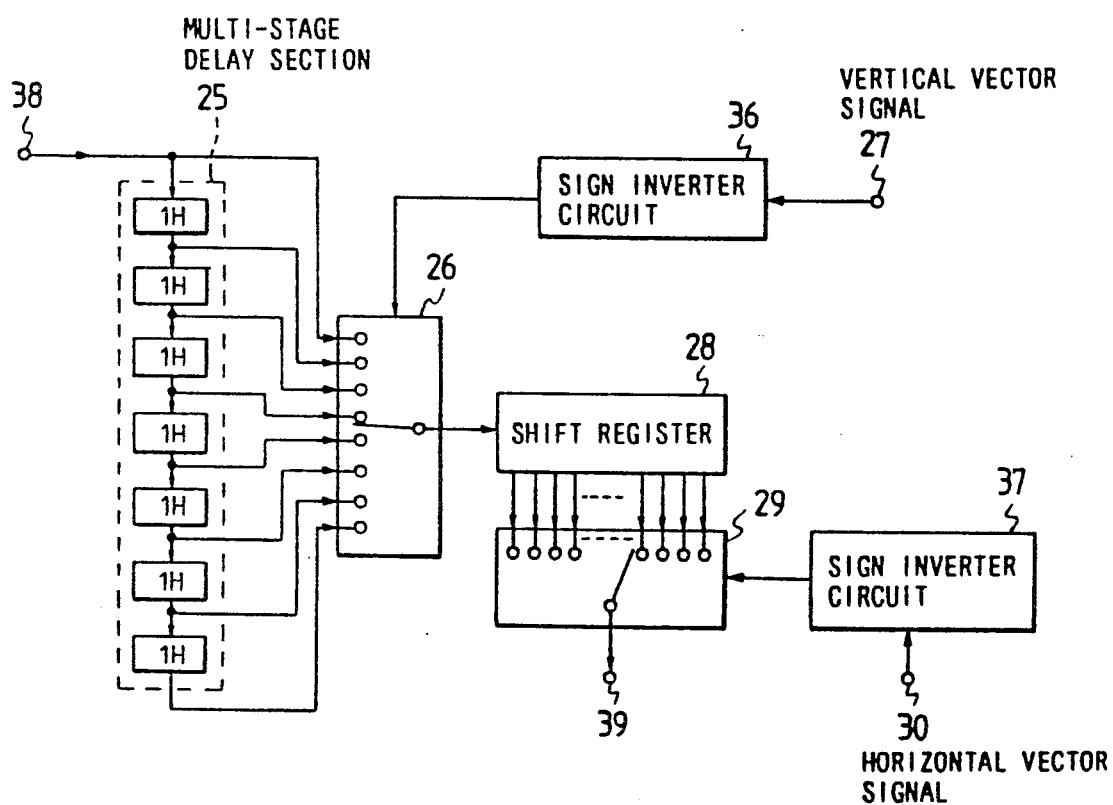
FIG. 10 is a circuit block diagram of an inverse motion vector compensation circuit in the embodiment of FIG. 9.

FIG. 10 is a circuit block diagram showing the internal configuration of the inverse motion vector compensation circuit 32. This is substantially identical to that of the 1-frame delay/motion compensation circuit 7, shown in FIG. 6 and described hereinabove. The operation of the circuit of FIG. 10 is as follows. The sign of the vertical motion vector signal is inverted by the sign inverter circuit 36, while the sign of the horizontal motion vector signal is inverted by the sign inverter circuit 37. As a result, motion vector compensation is applied in an amount which is identical to that applied by the 1-frame delay/motion compensation circuit 7, but which is in the opposite direction.

The input signal applied to the input terminal 38 thus has the motion vector compensation previously applied thereto cancelled, if that input signal (i.e. input sample values) is from the preceding frame. If it is the signal (i.e. sample values) of the current field on the other hand, motion vector compensation is applied in the opposite direction to that which is currently being applied by the 1-frame delay/motion compensation circuit 7. The resultant output signal is transferred from output terminal 39, to be supplied to the static component processing circuit 8 and the motion component processing circuit 9.

In FIG. 9, the motion component processing circuit 9 executes processing of the signal (i.e. sample values) of the preceding frame (occurring two field intervals prior to the current field), for which the motion vector compensation, if applied by the 1-frame delay/motion compensation circuit 7, has been cancelled as described hereinabove, i.e. which is never a signal to which motion vector compensation has been applied.

The inter-frame sub-sample control signal that is outputted from terminal 19b of the control signal separator circuit 19 is delayed by one frame interval in the 1-frame delay element 33, then is applied to control the phase of the inter-frame subsampling clock signal S3 (16.2 MHz) that controls the phase of intra-field interpolation by the intra-field interpolation circuit 13.

The static component processing circuit 8 processes the output signal from the inverse motion vector compensation circuit 32, i.e. execution interpolation using the signal of the field occurring one frame interval prior to the current field as the reference phase.

The intra-field subsampling control signal from output terminal 19c of the control signal separator circuit 19 is transferred through the 1-frame delay element 35 to be delayed by one frame interval, then applied to the inter-field sampling control circuit 21. The inter-field subsampling clock signal S4 is thereby outputted, as a 24.3 MHz signal whose phase is selectively set to one of two values differing by 180° in accordance with the output signal from the 1-frame delay element 35. The inter-field subsampling clock signal S4 is applied to control the interpolation phase of the inter-field interpolation circuit 12. The inter-field motion vector compensation signal M3 is delayed by one frame interval (since $n_2$ is now the reference field for inter-field compensation, rather than the current field $n_4$ as in the prior art example of FIG. 4), and supplied as signal M4 to circuit 12.

Figure 11:
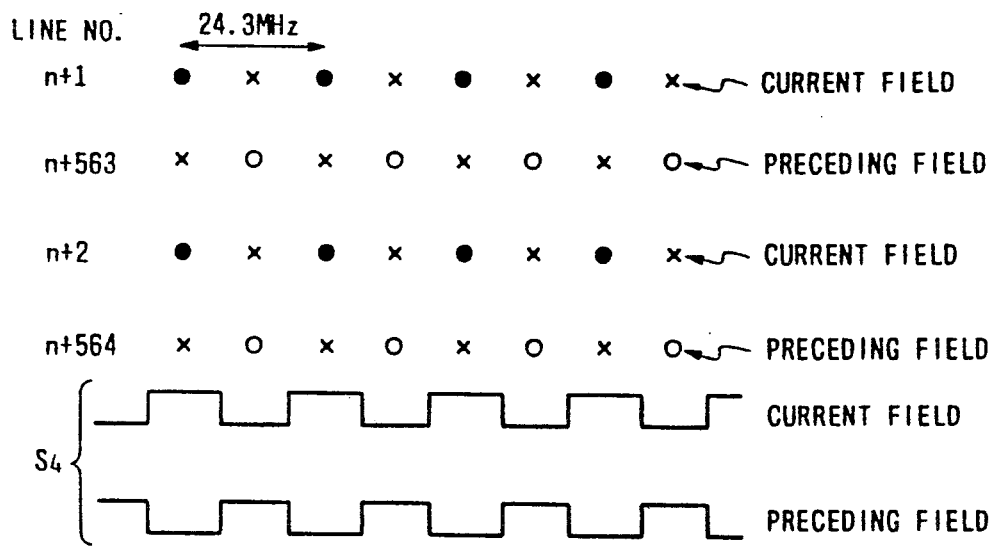
FIG. 11 is a timing diagram showing timing relationships between sample points and interpolation points for inter-field interpolation, in the embodiment of FIG. 9.

FIG. 11 is a timing diagram for illustrating the relationships between the inter-field subsampling clock signal S4 and the sample points and interpolation points of the input signal supplied from the sampling frequency conversion circuit 11 to the inter-field interpolation circuit 12 of the static component processing circuit 8 in FIG. 9. lines (n+1) and (n+2) are two successive lines of the current field, while (n+563) and (n+564) are corresponding successive lines of the preceding field. The black filled circles and open circles denote respective sample points of the current field and the preceding field respectively, while the "x" symbols indicate interpolation positions, into which interpolated values are inserted by the inter-field interpolation circuit 12. The inter-field subsampling clock signal S4 has a fixed phase throughout each field, and is phase inverted at the start of each new field. It can be understood that the H level state of the inter-field subsampling clock signal S4 always coincides with a sample point timing.

Figure 7A:
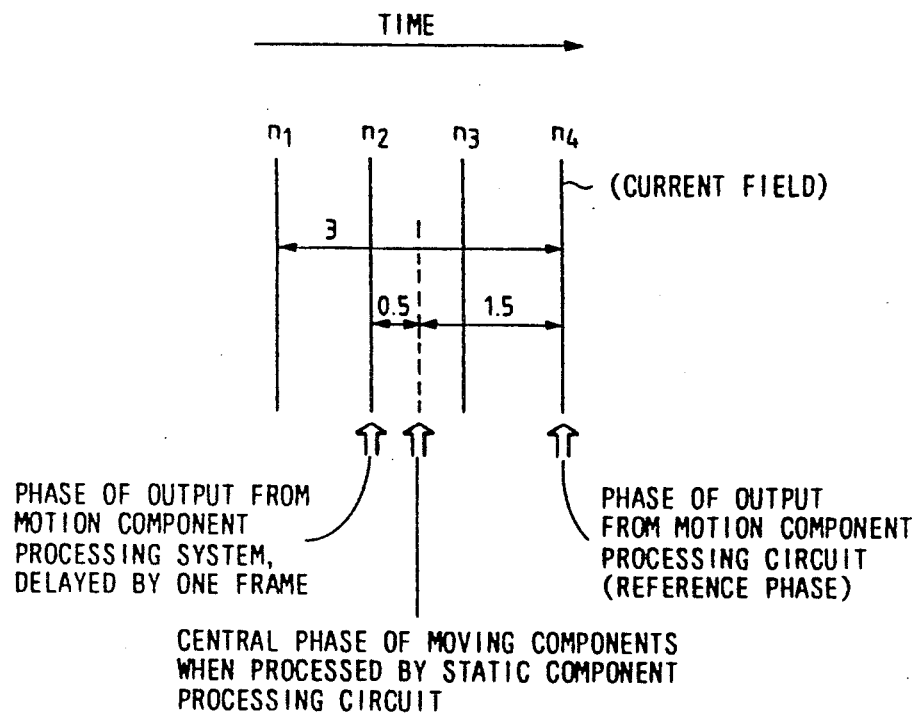
FIGS. 7A, 7B are diagrams for assistance in describing image phase relationships between successive fields, with and without motion vector compensation, for the example of FIG. 4.
Figure 7B:
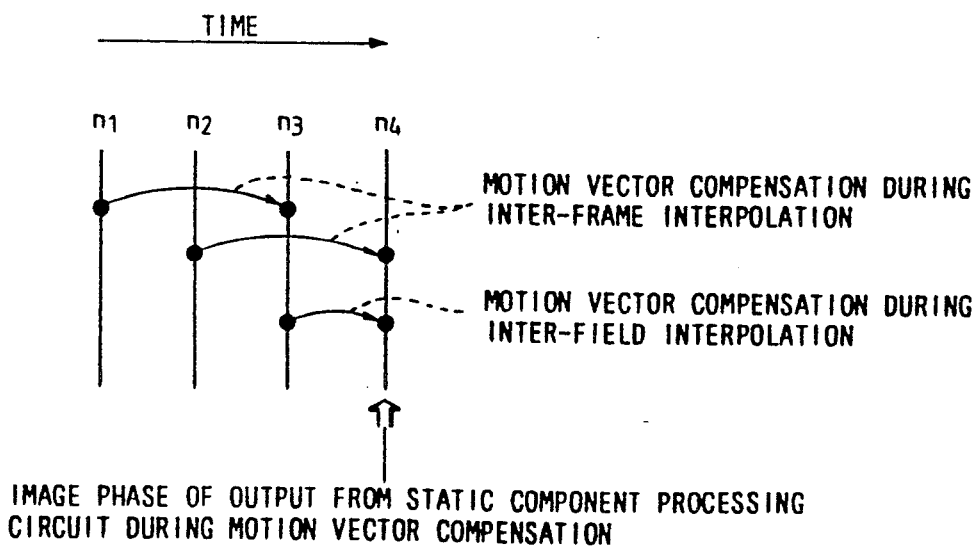
Figure 13A:
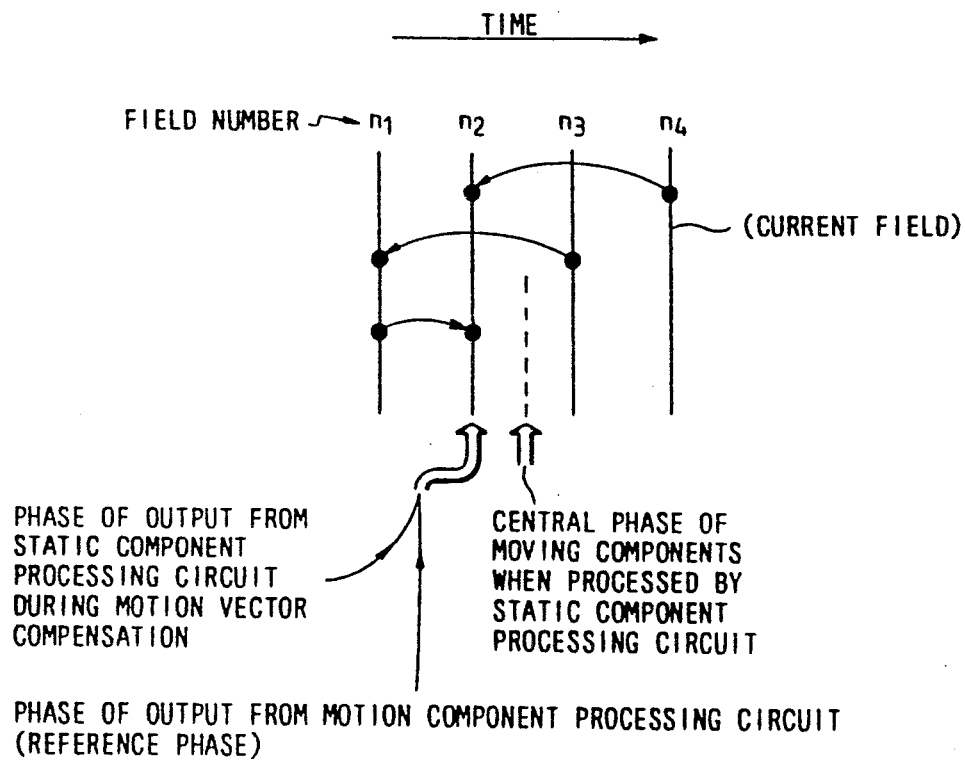

FIG. 13A is a diagram for illustrating the time axis relationships between successive fields and the effects of the motion vector compensation for the embodiment of FIG. 9. With the prior art example of FIG. 4, as described referring to FIG. 7B, the motion vector compensation shifting is applied only in the forward direction as indicated by the curved arrows. In FIG. 13, the image phase of the field occurring two field intervals prior to the current field (i.e. $n_2$) is the reference image phase. That is to say, inverse motion vector compensation is applied from the current field $n_4$ to field $n_2$, thereby bringing these fields into image phase coincidence, after field $n_3$ has been brought into image phase coincidence with $n_2$, and the combined fields $n_1$, $n_3$ are then brought into image phase coincidence with the combined fields $n_1$, $n_4$. Thus, the direction of interframe motion vector compensation with the present invention is the opposite to that of the prior art.

Figure 12:
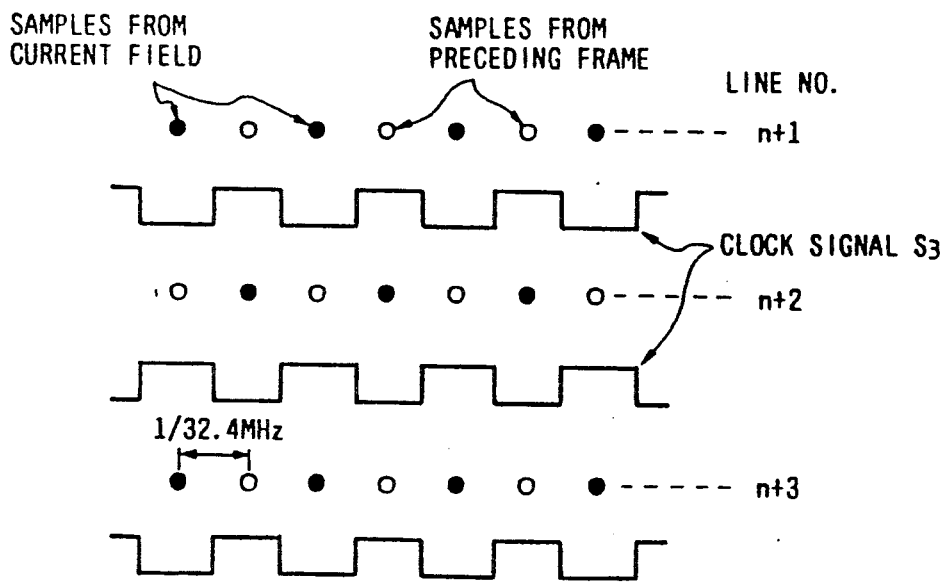
FIG. 12 is a timing diagram for illustrating a process of extracting sample values of the preceding frame, to be supplied to a motion component processing system in the embodiment of FIG. 9.

In this case, when detection error of the motion detection circuit 22 occurs, so that data representing a moving region are obtained from the output of the static component processing circuit 8 instead of from the motion component processing circuit 9, so that each field of the output signal from the encoder consists of four mutually superimposed fields as described above, then the image phase of such a moving region will be midway between that of fields $n_2$ and $n_3$. Due to the fact that the control signal applied to the inter-frame subsampling control circuit 34 from the output terminal 19b of the control signal separator circuit 19 has been delayed by one frame interval in the 1-frame delay element 33, the inter-frame subsampling clock signal S3 controls the switch 13a such as to select from the output signal of the inverse motion vector compensation circuit 32 the sample values of the field that occurred one frame interval prior to the current field, i.e. to select field $n_2$ rather than the current field $n_4$, as shown in FIG. 13. This selection operation is illustrated in FIG. 12, in which the samples from that preceding frame are selected in each interval when the inter-frame subsampling clock signal S3 is at the H logic level.

As a result, when erroneous operation of the motion detection circuit 22 occurs, the amount of image phase error that results will be only 0.5 times the image phase difference between successive fields, as illustrated in FIG. 13. This will be true both when the stationary regions of the display picture are truly stationary and also when overall (panning) motion is in progress, with motion vector compensation being applied. That amount of image phase error is sufficiently small that no significant visible effects will be produced in the resultant displayed picture, i.e. the unnatural movement which occurs for moving regions within the picture as a result of motion detection errors in the prior art are substantially completely eliminated.

Figure 5:
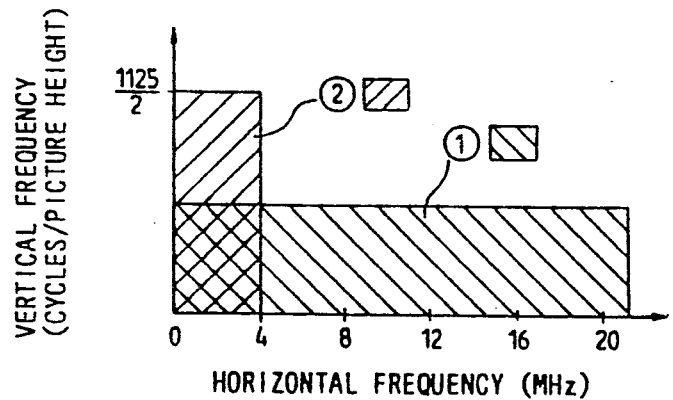
FIG. 5 shows a 2-dimensional frequency characteristic obtained from an inter-field interpolation filter and a frequency replacement circuit in the example of FIG. 4.
Figure 14:
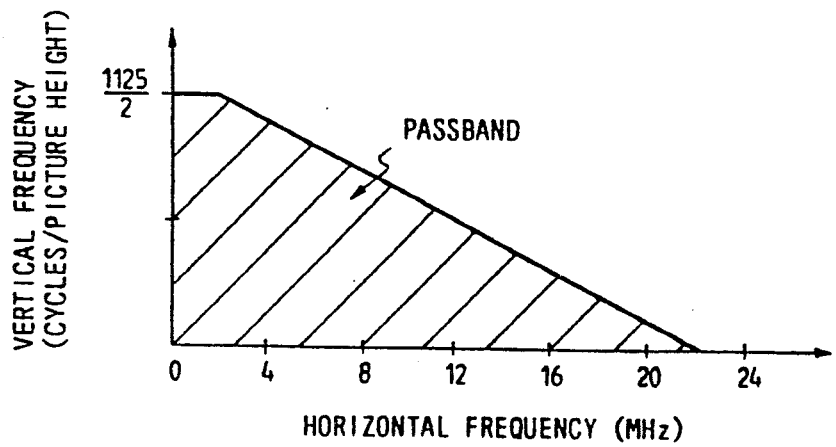
FIG. 14 shows a 2-dimensional frequency characteristic of an inter-field interpolation filter used in the embodiment of FIG. 9.

FIG. 14 is an example of a 2-dimensional frequency characteristic of the inter-field interpolation circuit 12 in the embodiment of FIG. 9. Since the first problem to be overcome by the invention is overcome as described above, it becomes possible to utilize a 2-dimensional filter for execution inter-field interpolation which provides high resolution in the low frequency (0 to approximately 4 MHz) range. As shown in FIG. 14, this frequency characteristic can include the combined frequency characteristics (1) and (2) of the prior art example of FIG. 5. Since it is no longer necessary to use the low-frequency replacement circuit 17 of the prior art example, the second problem to be overcome by the present invention is thereby eliminated.

The above points are further illustrated by FIG. 13B, in which it is assumed that camera panning in the horizontal direction as indicated has resulted in a stationary region 90 in the picture represented by the MUSE signal being moved from right to left in successive fields, through successive positions P1 to P4 in frames $n_1$ to $n_4$ respectively. $l_1$ denotes a motion vector value that is expressed by signals M1 while $n_3$ is the current field, and $l_2$ is the motion vector value of M1 while $n_4$ is the current field. As indicated, inverse and normal direction motion inter-frame vector compensation by the amount $l_1$ are applied to field $n_1$, and inverse motion vector compensation by the same amount is applied to field $n_3$. Thus when these are combined by inter-frame interpolation, the region 90 is positioned at P1 in the resultant frame, i.e. frame $n_2$ is the image phase reference field. Similarly, region 90 appears at position P2 when fields $n_2$ and $n_4$ are combined in the same way. When in-field motion vector compensation is then applied to the field derived from $n_1$ and $n_3$ as shown, and then this is inter-field interpolated with the field obtained by combining $n_2$ and $n_4$ (i.e. the latter combined field being the image phase reference field for inter-field motion vector compensation), the region 90 appears at position P2 in the resultant combined field. That combined field is constituted by the output signal from the motion component processing system while $n_4$ is the current field of the received MUSE signal.

Figure 15:
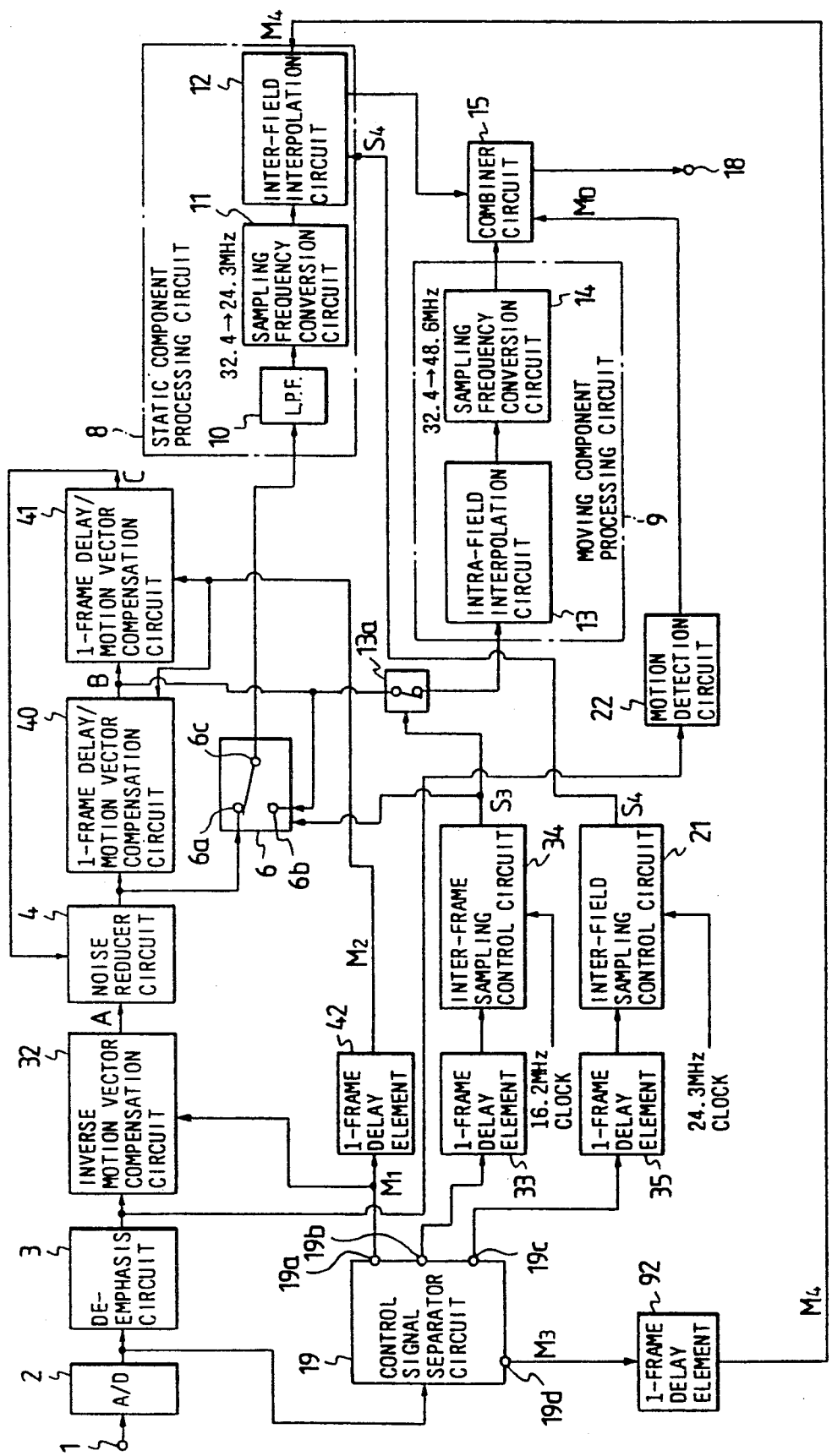
FIG. 15 is a circuit block diagram of a second embodiment of a MUSE decoder apparatus according to the present invention for a HDTV receiver; and, FIG. 16 is a circuit block diagram of a third embodiment of a MUSE decoder apparatus according to the present invention for a HDTV receiver.

With the first embodiment of the present invention shown in FIG. 9, the first and second problems are basically overcome by adding the inverse motion vector compensation circuit 32 and using a 2-dimensional filter for inter-field interpolation. FIG. 15 is a general circuit block diagram of a second embodiment of a MUSE decoder apparatus according to the present invention. Components within FIG. 15 which correspond to components in FIGS. 4 or 9 described hereinabove are designated by corresponding reference numerals, and detailed description of these will be omitted. The embodiment of FIG. 15 has the following points of difference from that of FIG. 9. An inverse motion vector compensation circuit 32 is inserted between the de-emphasis circuit 3 and the noise reducer circuit 4, the output signal from the noise reducer circuit 4 is not subjected to inter-frame interpolation, and 1-frame delay elements 40 and 41 are added for successively delaying the output signal from the noise reducer circuit 4.

The 1-frame delay/motion compensation circuits 40, 41 each basically apply a 1-frame delay to the output signal from the noise reducer circuit 4, which has a sampling frequency of 16.2 MHz, i.e. the digital MUSE signal prior to inter-frame interpolation having been applied. The 1-frame delay/motion compensation circuit 7 of the embodiment of FIG. 9 on the other hand, acts on the signal that results from inter-frame interpolation, having a sampling frequency of 32.4 MHz. Each of the 1-frame delay/motion compensation circuits 41 is actually a combination of a fixed delay element and variable horizontal and vertical delay stages, having the same internal configuration as the 1-frame delay/motion compensation circuit 7, and shown in FIG. 6A, providing a delay of exactly one frame interval when the motion vector signals applied thereto each express a value of zero. Motion vector compensation is applied as follows, with this embodiment. The motion vector signals M1, from output terminals 19a of the control signal separator circuit 19, control the inverse motion vector compensation circuit 32 to apply inverse motion vector compensation, while the motion vector signals M2 (i.e. the signals M2, delayed by one frame interval by the 1-frame delay element 42) control the 1-frame delay/motion compensation circuits 40, 41. The inter-frame interpolation is executed as follows. The signal of the current field, outputted from the noise reducer circuit 4, and the signal of the preceding frame, outputted from the 1-frame delay/motion compensation circuit 40, are alternately selected in units of pixels by the changeover switch 6, to obtain as output the inter-frame interpolated signal. The changeover switch 6 is controlled by the inter-frame subsampling clock signal S3, produced from the inter-frame subsampling cotrol circuit 34.

The inter-frame interpolated signal produced from the changeover switch 6 is inputted to the static component processing circuit 8, for static image processing as described hereinabove.

The motion vector compensation executed by the inverse motion vector compensation circuit 32 and the 1-frame delay/motion compensation circuits 40, 41 can be understood by referring to the appended Table 1, in which A denotes the output signal from the inverse motion vector compensation circuit 32, B denotes the output signal from the 1-frame delay/motion compensation circuit 40, and C denotes the output signal from the 1-frame delay/motion compensation circuit 41. $l_1$ to $l_6$ denote respective amounts of motion vector compensation. The table shows the relationships between amounts and drawings of motion vector compensation that are applied, with the minus sign indicating that inverse motion vector compensation occurs. The inverse motion vector compensation circuit 32 applies such inverse motion vector compensation, by inverting the sign of each motion vector signal as described hereinabove. Thus the output signal A always has had motion vector compensation applied that is equal in amount and in the opposite direction to that expressed by the motion vector signals M1. That signal A is then subjected to delay b one frame interval and to normal motion vector compensation in the 1-frame delay/motion compensation circuit 40, by an amount determined by the motion vector signal M2. Since M2 has been delayed by one frame interval relative to M1, it expresses the motion vector information of the preceding frame, so that any inverse motion vector compensation that has been applied by the inverse motion vector compensation circuit 32 is cancelled. Thus, the output signal B from the 1-frame delay/motion compensation circuit 40 always has had, in effect, zero motion vector compensation applied thereto. The signal B is then delayed by 1 frame interval and has normal motion vector compensation applied thereto based on the motion vector signals M2. As a result, the difference between the amounts of motion vector compensation applied the signals A and C is the total amount of motion vector compensation (expressed by signals M2) for two successive frames.

The output signal B (i.e. the MUSE signal of one frame prior to the current field, which has not been subjected to motion vector compensation) is inputted to the motion component processing circuit 9. In addition, signal B is applied to input terminal 6b of the changeover switch 6, to be interpolated with the signal A (after output from the noise reducer circuit 4), which is the signal of the current field and has had inverse motion vector compensation applied thereto. The resultant inter-field interpolated signal is applied to the LPF 10.

With this second embodiment of the present invention, the functions performed are essentially identical to those of the first embodiment, and identical results are obtained.

Figure 16:
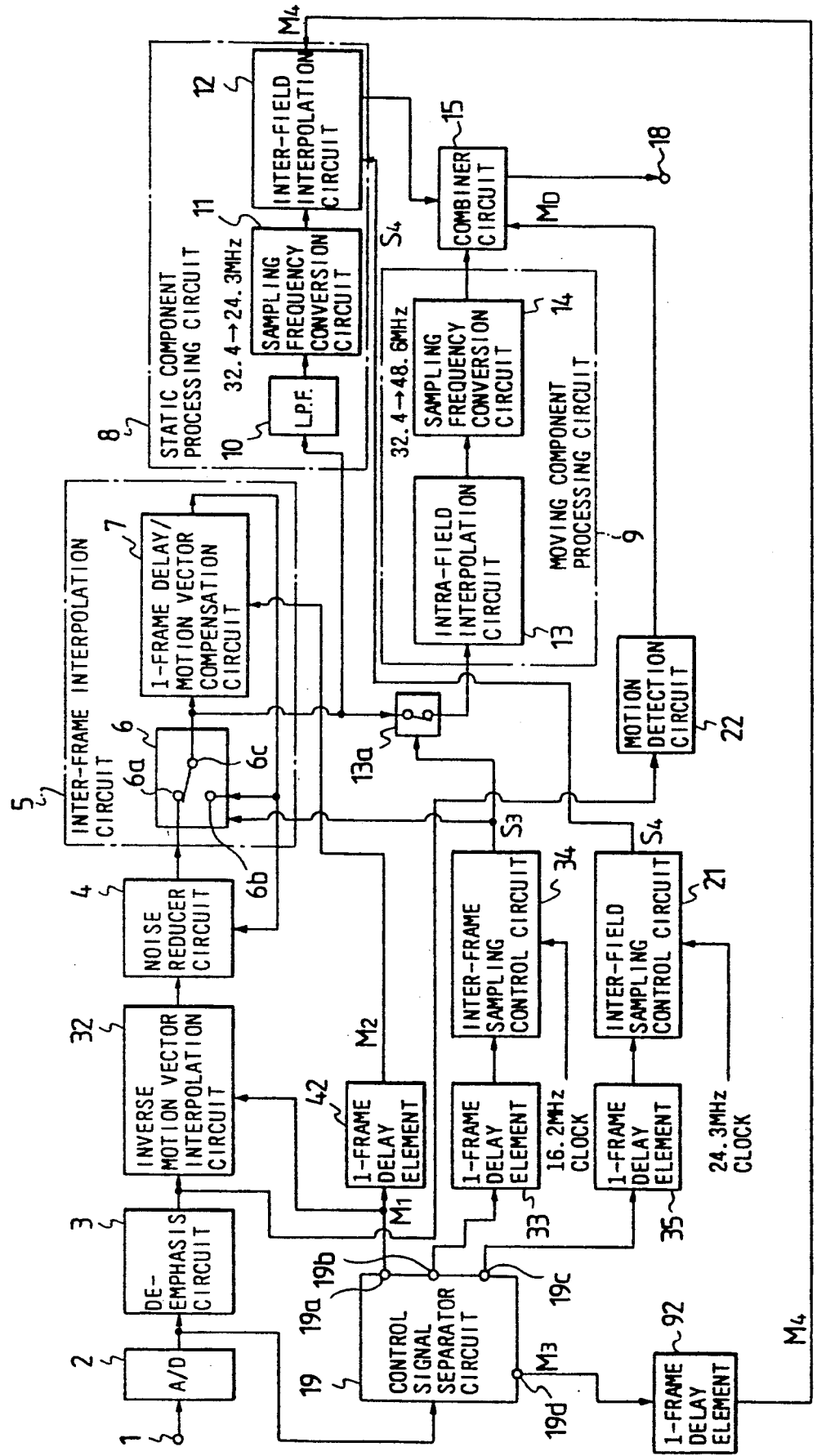

FIG. 16 is a general circuit block diagram of a third embodiment of a MUSE decoder apparatus according to the present invention. Components within FIG. 16 which correspond to components in FIGS. 4, 9 or 15 described hereinabove are designed by corresponding reference numerals, and detailed description of these will be omitted. The embodiment of FIG. 16 has the following points of difference from the second embodiment of FIG. 15 in that the 1-frame delay/motion compensation circuits 40, 41 of FIG. 15 are eliminated, and the arrangement of the changeover switch 6 is identical to that of the embodiment of FIG. 9. Thus whereas with the embodiment of FIG. 15 the output signal from the 1-frame delay/motion compensation circuit 41 has been delayed by a total of 2 frame intervals, the corresponding signal is obtained in FIG. 16 as a component of the output signal from the 1-frame delay/motion compensation circuit 7 which has passed through the 1-frame delay/motion compensation circuit 7 twice in succession.

The motion vector compensation operation is similar to that of the second embodiment of the invention described above. The inverse motion vector compensation circuit 32 is controlled by the motion vector signal M1, while the 1-frame delay/motion compensation circuit 7 is controlled by the motion vector signal M2, i.e. the signal M1 after a delay of one frame interval. The inverse motion vector compensation circuit 32 executes inverse motion vector compensation as described hereinabove. The resultant output signal has the noise components reduced in the noise reducer circuit 4, then this signal (i.e. the signal of the current field) has sample values of the preceding frame interpolated therein by the action of the changeover switch 6, to execute inter-frame interpolation. Thus, the output signal from the inverse motion vector compensation circuit 32 (corresponding to the signal A in Table 1) is delayed by one frame interval in the 1-frame delay/motion compensation circuit 7, and is subjected to motion vector compensation in the normal direction, based on the motion vector signal M2. The previously applied inverse motion vector compensation is thereby cancelled. Thus, the sample values contained in the output signal from the 1-frame delay/motion compensation circuit 7 that have been derived from the preceding frame (i.e. corresponding to signal B in Table 1) will have a motion vector compensation quantity of zero. The components of the output signal from the 1-frame delay/motion compensation circuit 7 that have been delayed by 2 frame intervals (corresponding to signal C in Table 1), have been subjected to motion vector compensation in the normal direction, and are inputted to the noise reducer circuit 4.

Thus, the third embodiment of the invention provides similar functions to the first and second embodiments described above, whereby the signals that are supplied to the static component processing system and the motion component processing system have each been delayed by one frame interval.

The above embodiments have been described for the case of m=4, i.e. image phase coincidence is established with respect to the field that occurs 2 field intervals prior to the current field. However the invention would be equally applicable to the use of other values of m, with the limitations on the value of m being as stated hereinabove.

From the above description, it can be understood that the basic features of the present invention are as follows. Of each set of four successively received fields $n_1$ to $n_4$ of the MUSE signal, the static component processing system combines the first field ($n_1$) with the third one ($n_3$) after applying a fixed amount of inter-frame motion vector phase shift to the sample values of the third field ($n_3$), determined by signals M1, to thereby obtain a first combined field, and similarly combines the second ($n_2$) and fourth ($n_4$) of these fields are after applying inter-frame phase shift to the fourth field ($n_4$) in accordance with the current state of M1, to thereby obtain a second combined field. In addition, the second field ($n_2$) is transferred (i.e. via switch 13a) to the motion component processing system in synchronism with outputting the second combined field. In addition, circuit 8 of the static component processing system combines the first and second combined fields, after after applying inter-field motion vector phase shifting to the sample values of the first combined field, in accordance with the current state of signals M3, to thereby obtain a third combined field. The sample values of the third combined field are successively inputted to the signal combining circuit, to be combined with the output values from the motion component processing system. Thus, the phase relationships described hereinabove referring to FIG. 13 are established for each set of four successive received fields, whereby the adverse display effects which result from inaccurate operation of the motion detection circuit (22) are substantially eliminated.

TABLE 1

| Frame number | Motion vector value | Compensation amounts at respective circuit positions | | |
|---|---|---|---|---|
| | | A | B | C |
| 1 | 0 | 0 | 0 | 0 |
| 2 | $l_1$ | $-l_1$ | 0 | 0 |
| 3 | $l_2$ | $-l_2$ | 0 | $l_1$ |
| 4 | $l_3$ | $-l_3$ | 0 | $l_2$ |
| 5 | $l_4$ | $-l_4$ | 0 | $l_3$ |
| 6 | $l_5$ | $-l_5$ | 0 | $l_4$ |
| 7 | $l_6$ | $-l_6$ | 0 | $l_5$ |
| 8 | 0 | 0 | 0 | $l_6$ |
| 9 | 0 | 0 | 0 | 0 |

What is claimed is:

1. A high definition television receiver decoder apparatus for processing a transmitted television signal including image data sample values produced by inter-frame and inter-field offset sampling to achieve bandwidth compression and including, transmitted with each field of the television signal, and inter-frame and inter-field motion vector data expressing respective amounts of uniform picture motion of the field, the decoder apparatus comprising a motion component processing system for executing intra-field interpolation of successive fields, a static component processing system, area motion detection means for judging whether each of the sample values is part of a moving region within a picture expressed by a field, and combining means for combining output sample values produced from the motion component processing system and static component processing system in proportions determined by the area motion detection means to thereby output image sample values, wherein said decoding apparatus operates on data of successive sets of four successively received fields ($n_1$, $n_2$, $n_3$, $n_4$), of which a fourth field ($n_4$) is a current field which is currently being received by said apparatus, and wherein the static component processing system comprises:

inter-frame interpolation and motion vector compensation means for combining a first one ($n_1$) of said four successively received fields with a third one ($n_3$) of the fields after applying an amount of phase shift to sample values of said third field ($n_3$) in accordance with said inter-frame motion vector data, to thereby obtain a first combined field, and for combining a second one ($n_2$) of said fields with said fourth current one ($n_4$) of said four fields after applying a fixed amount of phase shift to sample values of said current field ($n_4$) in accordance with said inter-frame motion vector data, to thereby obtain a second combined field, and moreover for supplying said second field ($n_2$) to said motion component processing system in synchronism with outputting said second combined field; and inter-field interpolation and motion vector compensation means for combining said first combined field with said second combined field after applying a fixed value of phase shift to sample values of said first combined field in accordance with said inter-field motion vector data, to thereby obtain a third combined field, with sample values of said third combined field being successively inputted to said combining means;

wherein said motion component processing system executes intra-field interpolation of said second one ($n_2$) of said four successively received fields, and wherein said second field ($n_2$) which occurs two fields prior to said current field ($n_4$) is utilized as a time axis reference field for each of said motion component processing system and said static component processing system.

2. A high definition television receiver decoder apparatus for processing a transmitted television signal including image data sample values produced by inter-frame and inter-field offset sampling to achieve bandwidth compression and including, transmitted with each field of the television signal, and inter-frame and inter-field motion vector data expressing respective amounts of uniform picture motion of the field, the decoder apparatus comprising a motion component processing system for executing intra-field interpolation of successive fields, a static component processing system, area motion detection means for judging whether each of the sample values is part of a moving region within a picture expressed by a field, and combining means for combining output sample values produced from the motion component processing system and static component processing system in proportions determined by the area motion detection means to thereby output image sample values, in which the static component processing system comprises:

inter-frame interpolation and motion vector compensation means for combining a first one ($n_1$) of four successively received fields with a third one ($n_3$) of the fields after applying an amount of phase shift to sample values of said third field ($n_3$) in accordance with said inter-frame motion vector data, to thereby obtain a first combined field, and for combining a second one ($n_2$) with a fourth one ($n_4$) of said four fields after applying a fixed amount of phase shift to sample values of said fourth field ($n_4$) in accordance with said inter-frame motion vector data, to thereby obtain a second combined field, and moreover for supplying said second field ($n_2$) to said motion component processing system in synchronism with outputting said second combined field; and inter-field interpolation and motion vector compensation means for combining said first combined field with said second combined field after applying a fixed value of phase shift to sample values of said first combined field in accordance with said inter-field motion vector data, to thereby obtain a third combined field, with sample values of said third combined field being successively inputted to said combining means;

wherein said motion component processing system executes intra-field interpolation of said second one ($n_2$) of said four successively received fields, in which said inter-frame interpolation and motion vector compensation means comprises inverse motion vector compensation means for applying to the sample values of each of said four successive fields ($n_1$, $n_2$, $n_3$, $n_4$) an amount of inverse phase shift that is of opposite polarity to a value of phase shift specified by said inter-frame motion vector data, and motion vector compensation means for applying to said first field ($n_1$) and said second field ($n_2$)

respective values of phase shift specified by said inter-frame motion vector data, to thereby cancel the inverse phase shift previously applied thereto.

3. A high definition television receiver decoder apparatus for processing a transmitted television signal including image data sample values produced by inter-frame and inter-field offset sampling to achieve bandwidth compression and including, transmitted with each field of the television signal, and inter-frame and inter-field motion vector data expressing respective amounts of uniform picture motion of the field, the decoder apparatus comprising a motion component processing system for executing intra-field interpolation of successive fields, a static component processing system, area motion detection means for judging whether each of the sample values is part of a moving region within a picture expressed by a field, and combining means for combining output sample values produced from the motion component processing system and static component processing system in proportions determined by the area motion detection means to thereby output image sample values, in which the static component processing system comprises:

inter-frame interpolation and motion vector compensation means for combining a first one ($n_1$) of four successively received fields with a third one ($n_3$) of the fields after applying an amount of phase shift to sample values of said third field ($n_3$) in accordance with said inter-frame motion vector data, to thereby obtain a first combined field, and for combining a second one ($n_2$) with a fourth one ($n_4$) of said four fields after applying a fixed amount of phase shift to sample values of said fourth field ($n_4$) in accordance with said inter-frame motion vector data, to thereby obtain a second combined field, and moreover for supplying said second field ($n_2$) to said motion component processing system in synchronism with outputting said second combined field; and inter-field interpolation and motion vector compensation means for combining said first combined field with said second combined field after applying a fixed value of phase shift to sample values of said first combined field in accordance with said inter-field motion vector data, to thereby obtain a third combined field, with sample values of said third combined field being successively inputted to said combining means;

wherein said motion component processing system executes intra-field interpolation of said second one ($n_2$) of said four successively received fields, in which said inter-frame interpolation and motion vector compensation means comprises motion vector compensation means for applying to the sample values of said first and second fields ($n_1$, $n_2$) an amount of phase shift that is specified by current values of said inter-frame motion vector data, and inverse motion vector compensation means for thereafter applying to the sample values of each of said four fields ($n_1$, $n_2$, $n_3$, $n_4$) respective amounts of inverse phase shift which are of opposite polarity to values of phase shift specified by said inter-frame motion vector data, to thereby cancel the phase shift previously applied to said first and second fields ($n_1$, $n_2$).

* * * * *

UNITED STATES PATENT AND TRADEMARK OFFICE
CERTIFICATE OF CORRECTION

PATENT NO. : 5,144,427
DATED : September 1, 1992
INVENTOR(S) : Masahiro KITAURA et al.

It is certified that error appears in the above-indentified patent and that said Letters Patent is hereby corrected as shown below:

On the title page, item [30] should read as follows:

--[30]   Foreign Application Priority Data
   Jun. 20, 1989 [JP] Japan . . . . . . . . . 1-157994--

Signed and Sealed this

Ninth Day of May, 1995

Attest:

BRUCE LEHMAN

Attesting Officer

Commissioner of Patents and Trademarks